(12) United States Patent
McDonald

(10) Patent No.: US 11,297,964 B1
(45) Date of Patent: Apr. 12, 2022

(54) ANTIMICROBIAL ROLL-UP FLOOR COVER

(71) Applicant: McTech Group, Inc., Hertford, NC (US)

(72) Inventor: Stephen F. McDonald, Hertford, NC (US)

(73) Assignee: McTech Group, Inc., Hertford, NC (US)

( * ) Notice: Subject to any disclaimer, the term of this patent is extended or adjusted under 35 U.S.C. 154(b) by 0 days.

(21) Appl. No.: 17/068,170

(22) Filed: Oct. 12, 2020

Related U.S. Application Data

(63) Continuation-in-part of application No. 17/030,939, filed on Sep. 24, 2020, now Pat. No. 11,035,137.

(51) Int. Cl.
*E04G 21/24* (2006.01)
*A47G 27/02* (2006.01)
(Continued)

(52) U.S. Cl.
CPC .......... *A47G 27/0206* (2013.01); *B32B 5/022* (2013.01); *B32B 5/024* (2013.01);
(Continued)

(58) Field of Classification Search
CPC ... E04G 21/246; B32B 5/26024; B32B 5/028; B32B 5/18; B32B 5/245; B32B 5/26;
(Continued)

(56) References Cited

U.S. PATENT DOCUMENTS 4,485,137 A  11/1984  White
4,704,117 A  11/1987  Mitchell
(Continued)

FOREIGN PATENT DOCUMENTS

CN  101775884 A  7/2010
CN  102191847 A  9/2011
(Continued)

OTHER PUBLICATIONS

Sean M. Walsh, Creating a Comprehensive Antimicrobial Concrete Coating System.
(Continued)

*Primary Examiner* — Vincent Tatesure
(74) *Attorney, Agent, or Firm* — Mehrman Law Office; Michael J. Mehrman

(57) ABSTRACT

A temporary roll-up floor cover includes a rugged upper layer that is impervious to water and pervious water vapor, and a lower antimicrobial wicking layer that quickly spreads water while transmitting water vapor, to facilitate evaporation of moisture that gets under the cover. The cover may also include one or more of a central layer containing a microporous membrane, a coating or film layer which may be perforated, and a stiffener lattice that resists folding, gathering and puckering without preventing the cover from rolling up. The coating layer adds additional resistance to folding, gathering and puckering without preventing the cover from rolling up. The coating may be perforated to increase water vapor transmission through the cover. One or more antimicrobial agents may be incorporated into the floor cover, for example, into the wicking layer during extrusion of the airlaid mat forming the wicking layer.

20 Claims, 15 Drawing Sheets

(51) Int. Cl.
  *B32B 5/02* (2006.01)
  *B32B 5/26* (2006.01)
  *B32B 5/18* (2006.01)
  *B32B 5/24* (2006.01)
(52) U.S. Cl.
  CPC ............... *B32B 5/028* (2013.01); *B32B 5/18* (2013.01); *B32B 5/245* (2013.01); *B32B 5/26* (2013.01); *B32B 2255/02* (2013.01); *B32B 2262/0253* (2013.01); *B32B 2262/062* (2013.01); *B32B 2266/025* (2013.01); *B32B 2305/022* (2013.01); *B32B 2307/7145* (2013.01); *B32B 2307/724* (2013.01); *B32B 2307/7265* (2013.01); *B32B 2471/04* (2013.01)
(58) Field of Classification Search
  CPC ............... B32B 27/12; B32B 2262/02; B32B 2262/062; B32B 2262/726; A47G 27/0206
  USPC .......................................... 264/228; 428/138
  See application file for complete search history.

(56) References Cited

U.S. PATENT DOCUMENTS

| | | | |
|---|---|---|---|
| 5,026,591 A * | 6/1991 | Henn | ..................... B01D 69/10 428/198 |
| 5,028,468 A | 7/1991 | Taylor | |
| 5,780,367 A | 7/1998 | Handwerker | |
| 5,843,554 A | 12/1998 | Katz | |
| 5,888,526 A | 3/1999 | Tsubai et al. | |
| 6,531,206 B2 | 3/2003 | Johnston et al. | |
| 7,182,989 B2 | 2/2007 | Higgins et al. | |
| 7,183,524 B2 | 2/2007 | Naylor et al. | |
| 7,345,004 B2 | 3/2008 | Zenker et al. | |
| 7,572,525 B2 | 8/2009 | McDonald | |
| 7,846,856 B2 | 12/2010 | Ghosh et al. | |
| 8,216,659 B2 | 7/2012 | Zafiroglu | |
| 9,091,049 B2 | 7/2015 | Walker | |
| 9,739,068 B2 | 8/2017 | Richards et al. | |
| 10,226,047 B2 | 3/2019 | Gooch et al. | |
| 10,322,954 B2 | 6/2019 | Gooch | |
| 2002/0142125 A1 | 10/2002 | Seal | |
| 2004/0258870 A1 | 12/2004 | Oakey et al. | |
| 2006/0089067 A1 | 4/2006 | Baker, Jr. et al. | |
| 2009/0148596 A1 | 6/2009 | Carroll et al. | |
| 2010/0025886 A1 | 2/2010 | Carroll | |
| 2010/0197027 A1 | 8/2010 | Zhang et al. | |
| 2010/0255048 A1 * | 10/2010 | Schmidt | ............ A61F 13/00063 424/402 |
| 2012/0077007 A1 * | 3/2012 | McDonald | ............ B28B 11/247 428/220 |
| 2013/0037989 A1 * | 2/2013 | Wiercinski | .............. E04B 1/665 264/259 |
| 2016/0229162 A1 | 8/2016 | Kafiah et al. | |
| 2017/0291385 A1 | 10/2017 | Carroll | |
| 2019/0022893 A1 | 1/2019 | Ozol et al. | |

FOREIGN PATENT DOCUMENTS

| | | |
|---|---|---|
| CN | 104870178 A | 8/2015 |
| CN | 208857158 U | 8/2018 |
| CN | 105209251 B | 9/2018 |
| DE | 1924575 A1 | 11/1970 |
| DE | 202016008503 U1 | 3/2018 |
| JP | H09241578 A | 9/1997 |
| JP | H10266544 A | 10/1998 |
| JP | 2000041513 A | 2/2000 |
| JP | 2004190477 A | 7/2004 |
| JP | 2004218219 A | 8/2004 |
| JP | 2005171547 A | 6/2005 |
| JP | 2009002144 A | 1/2009 |
| JP | 5169567 B2 | 3/2013 |
| KR | 100754424 B1 | 8/2007 |
| RS | 20140495 A1 | 4/2016 |
| WO | 2003064412 A1 | 8/2003 |
| WO | 2018187329 A1 | 10/2018 |
| WO | 2018187564 A1 | 10/2018 |

OTHER PUBLICATIONS

Florock, Antimicrobial Epoxy Flooring.
Floor Coverings in Healthcare Buildings, The Centre for Health Assets Australasia (CHAA), 2009.
Elantas Beck India Limited, Elantas Beck India Limited Construction Chemicals, Mar. 2018.
Seven Trust, Welcome To Seven Trust.
Concare Inc, Antimicrobial Floors & Walls.
Zandile Mavuso, Company Develops New Concrete Curing Blanket, Jun. 7, 2019.
Reef Industries Inc, Concrete Curing Covers, Houston, TX, accessed Sep. 20, 2020.
Sirikamon Saengmeeanupharb et al., Antimicrobial effects of silver zeolite, silver zirconium phosphate silicate and silver zirconium phosphate against oral microorganisms, Jan. 2013.
Paris M. Allen1 and David Gottlieb, Mechanism of Action of the Fungicide Thiabendazole, 2-(4'-Thiazolyl) Benzimidazole, Dec. 1970.
https://www.biocidalpolymer.com, Polyhexidine, accessed Feb. 12, 2021.

* cited by examiner

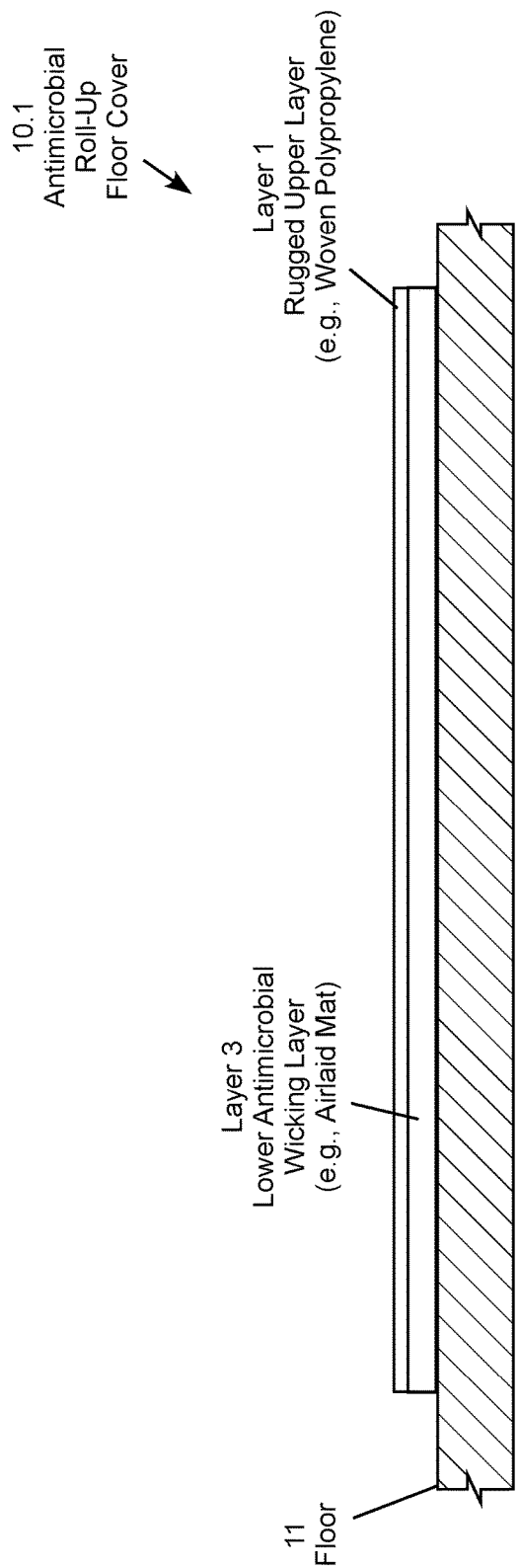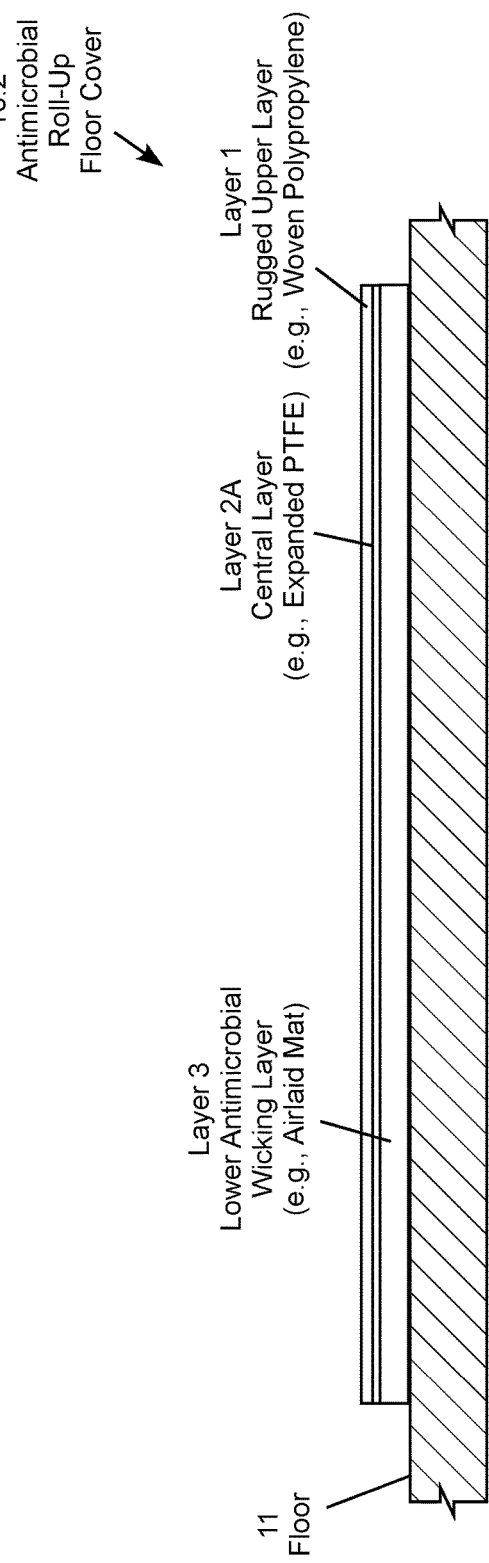

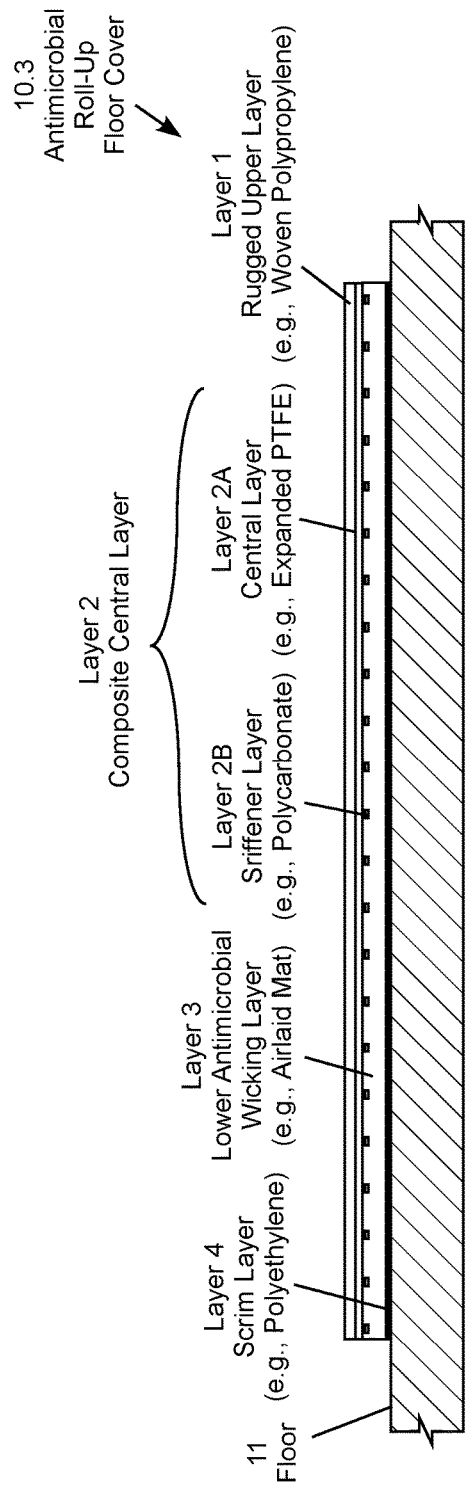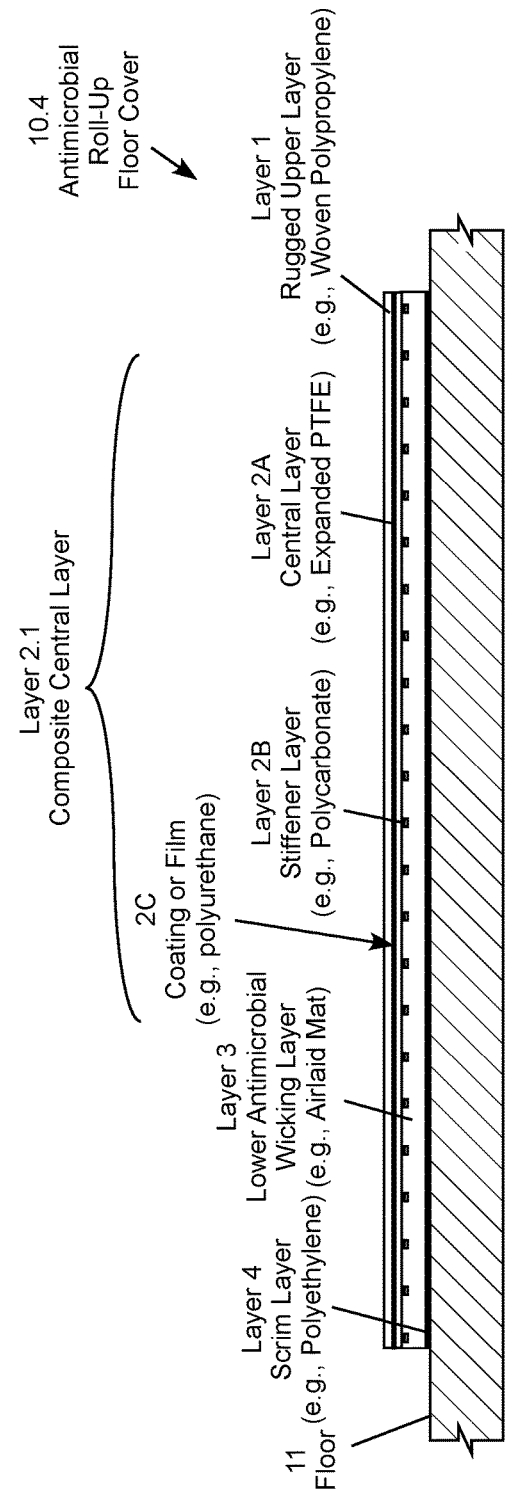

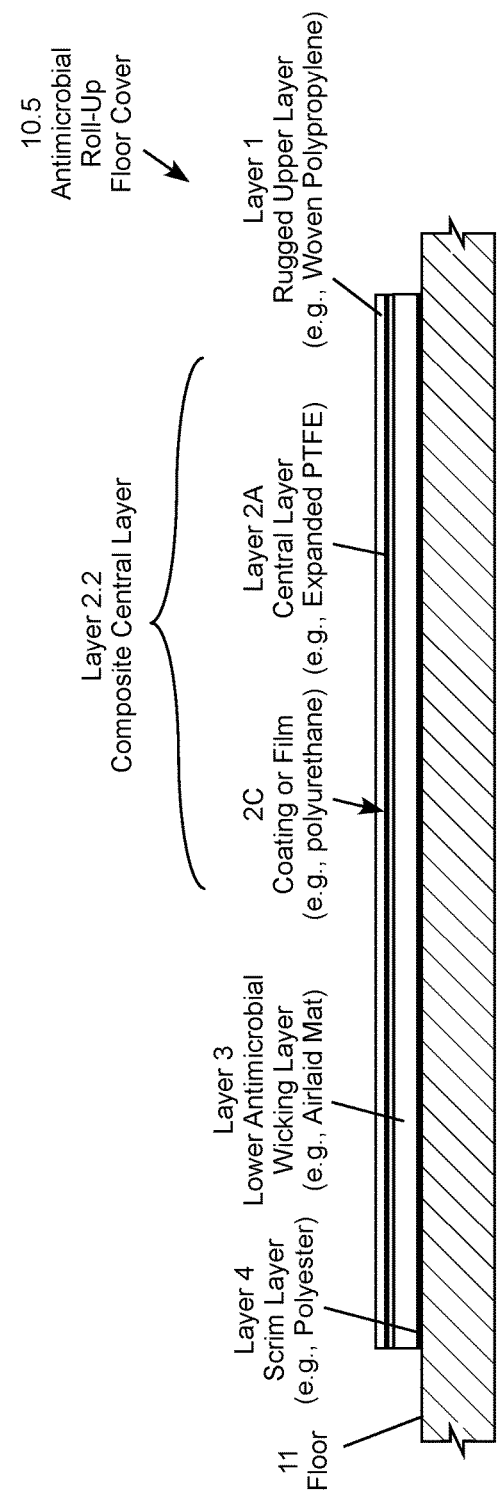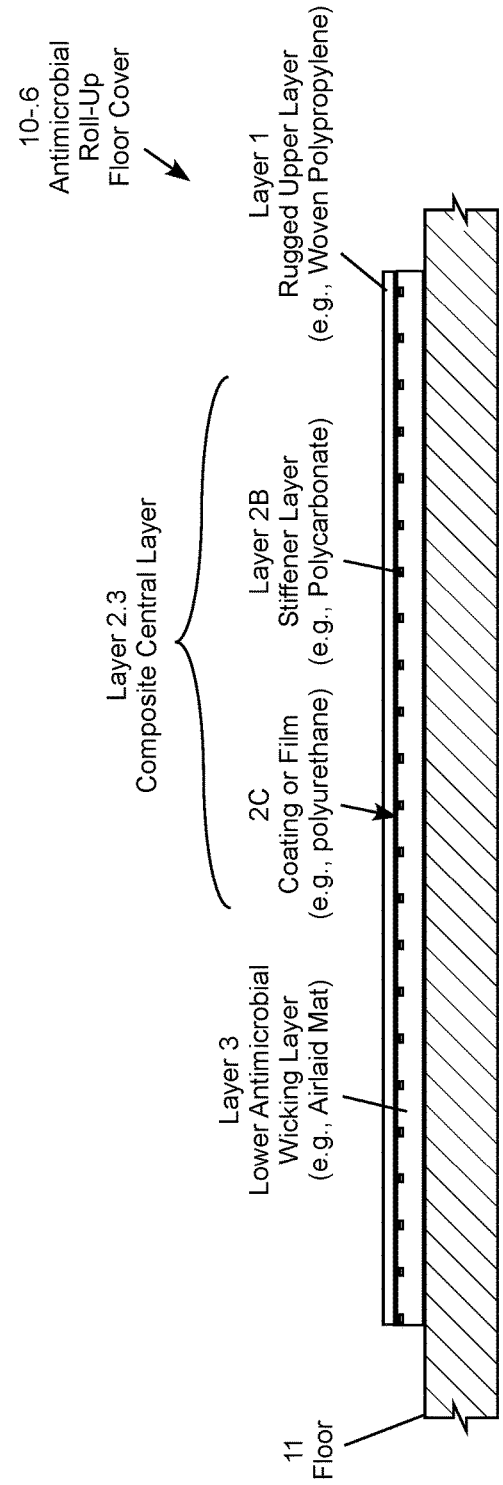

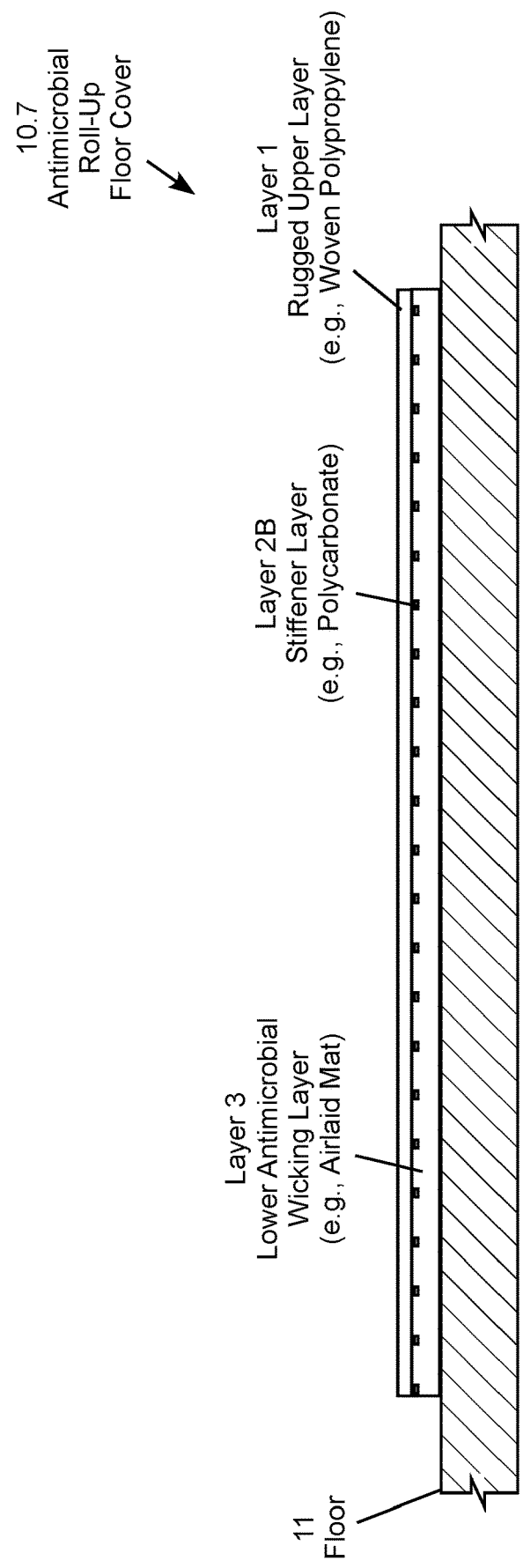

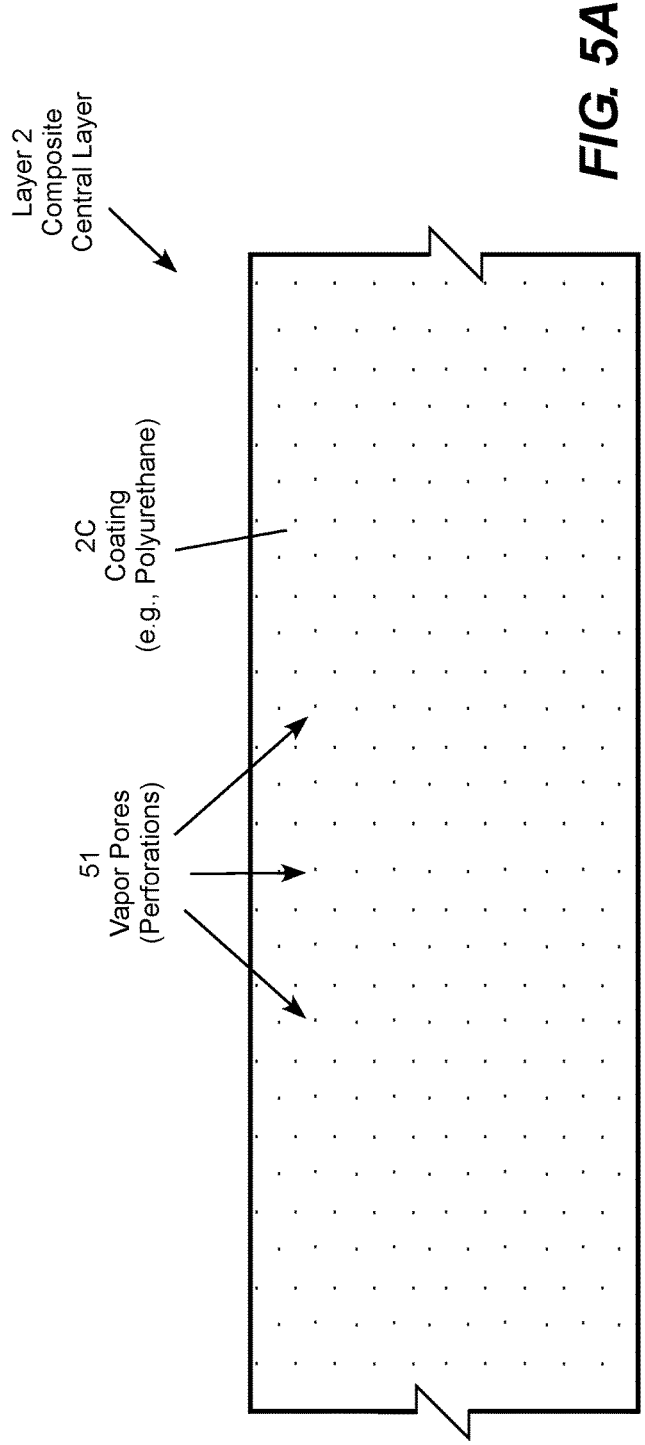
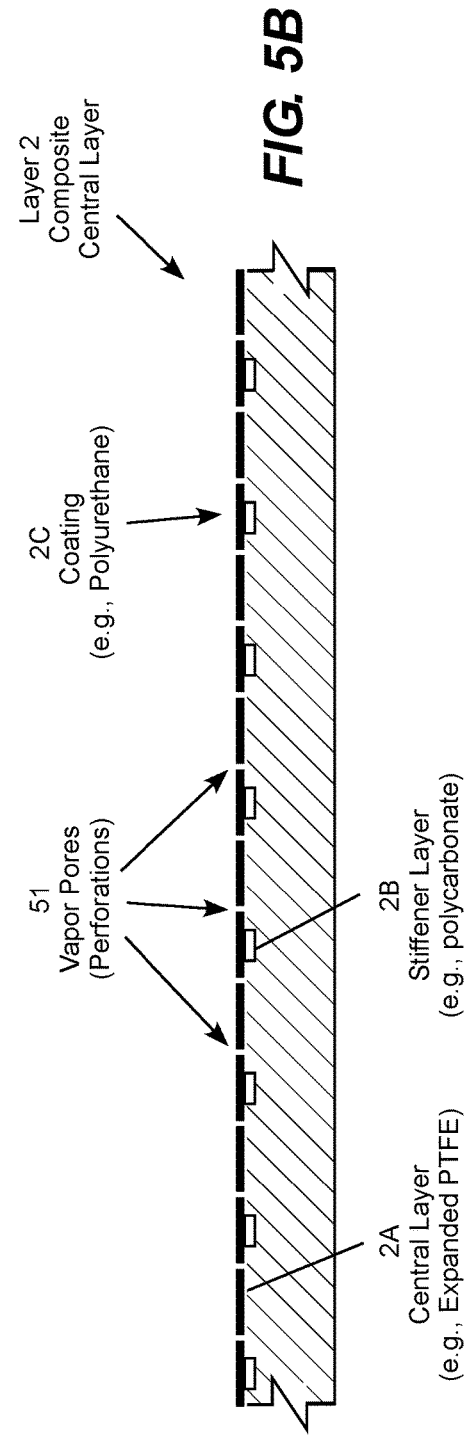

ANTIMICROBIAL ROLL-UP FLOOR COVER

REFERENCE TO RELATED APPLICATIONS

The application claims priority to U.S. patent application Ser. No. 17/030,939 filed Sep. 24, 2020, which is incorporated by reference.

TECHNICAL FIELD

The present invention relates to floor coverings and, more particularly, to a temporary roll-up floor cover that may include one or more antimicrobial agents.

BACKGROUND

Antimicrobial agents have been incorporated into many materials including floor coverings. See, for example, Tsubai et al., U.S. Pat. No. 5,888,526, which is incorporated by reference. While carpet and many other floor coverings are fabricated in rolls, Tsubai et al. describes hard tiles that are more difficult and time consuming to lay down and take up, which is a significant drawback for temporary floor covers. Antimicrobial agents also have been incorporated into fabrics and other textiles more generally. See, for example, Baker Jr., U.S. Pub. No. 20060089067, which is incorporated by reference. However, these products are generally not sufficiently rugged and durable to work well as temporary floor covers. For example, typical soft fabrics tend to fold, gather and pucker under wheels, which can jam wheeled devices and damage the cover. Many antimicrobial textiles are not sufficiently impervious to water, oil and other contaminants, while waterproof materials often trap moisture below the cover allowing mold, mildew, bacteria and viruses to grow under and within the cover.

As a result, there is a persistent need for cost effective temporary roll-up floor covers. There is a further need for antimicrobial floor covers that are sufficiently impervious to water, oil and other contaminants, while preventing or inhibiting mold, mildew, bacteria and viruses from growing under and within the cover.

SUMMARY

The present invention meets the needs described above in a temporary roll-up floor cover that includes a top layer that is impervious to water and permeable to water vapor, and a lower layer including an airlaid mat and one or more antimicrobial agents, which is permeable to water and permeable to water vapor permeable. The floor cover is configured to roll out for temporary positioning on a floor, and to roll up for easy removal from the floor. As an option, the temporary floor cover may also include a central microporous membrane layer positioned between the top layer and the lower layer, which may have a coating that may be perforated. Additional options include one or more antimicrobial agents, a stiffening lattice positioned between the top layer and the lower layer, and an anti-snag scrim layer positioned below the lower layer.

In an illustrative embodiment, the top layer includes woven polypropylene exhibiting a weight in the range of 6 to 10 ounces per square yard, the lower layer includes cellulose fluff pulp and binder fibers exhibiting a weight in the range of 4.0 to 7.5 ounces per square yard, and the central layer includes expanded polytetrafluoroethylene (PTFE) exhibiting a weight in the range of 0.5 to 1.5 ounces per square yard. The expanded PTFE microporous membrane may have a polyurethane coating, which may be perforated. The stiffening lattice may include cross members with lengths in the range of 4 to 10 inches, widths in the range of 0.125 to 0.25 inches, and thicknesses in the range of 0.0625 to 0.125 inches fabricated from polycarbonate, high density polyethylene (HDPE), acrylonitrile butadiene styrene (ABS), or Nylon. The antimicrobial agents may include one or more of thiazolylbenzimidazole (TBZ), quaternary ammoniums (QACs or quats), silane QACs (si-quats), n-halamines, isothiazolinone, tiabendazole, polyhexamethylene biguanide (PHMB), triclosan, chitosan, sodium percarbonate, calcium hypochlorite, and metals compounds, such as metal salts (e.g., salts of Ag, Ti, Zn, Cu, etc.), zinc pyrithione, silver zeolite, silver zirconium phosphate, silver zirconium phosphate silicate, silver nitrate, copper sulfate, zinc nitrate, silver chloride, copper chloride, zinc chloride.

According to an aspect of the invention, a temporary floor cover is fabricated by mixing one or more antimicrobial agents, cellulose fluff pulp, and binder fibers to create an airlaid mat mixture, extruding the airlaid mat mixture onto a first conveyor to create an antimicrobial airlaid wicking layer, and rolling the antimicrobial airlaid wicking layer into a roll of the antimicrobial airlaid wicking layer. The roll of the antimicrobial airlaid wicking layer is then unrolled onto a second conveyor along with a top layer as they travel on the second conveyor to create a temporary floor cover, which is rolled into a roll as it comes off the second conveyor. In addition, one or more of a stiffener lattice, a microporous membrane, and a coating or film layer may be unrolled between the top layer and the lower airlaid mat layer. Additionally or alternatively, one or more of the antimicrobial agents may be spread, for example by spraying dissolved agents in liquid form, onto one or more of the layer as they are traveling on the second conveyor. Hotmelt adhesive may also be applied between one or more of the layers.

In view of the foregoing, it will be appreciated that the temporary roll-out floor cover represents a significant improvement in antimicrobial floor covers. The foregoing relates only to the exemplary embodiments of the present invention, and that numerous changes may be made therein without departing from the spirit and scope of the invention as defined by the following claims.

BRIEF DESCRIPTION OF THE FIGURES

FIG. 1A is a conceptual side view of a first antimicrobial roll-up floor cover.

FIG. 1B is a is a conceptual side view of a second antimicrobial roll-up floor cover.

FIG. 1C is a conceptual side view of a third antimicrobial roll-up floor cover.

FIG. 1D is a conceptual side view of a fourth antimicrobial roll-up floor cover.

FIG. 1E is a conceptual side view of a fifth antimicrobial roll-up floor cover.

FIG. 1F is a conceptual side view of a sixth antimicrobial roll-up floor cover.

FIG. 1G is a conceptual side view of a seventh antimicrobial roll-up floor cover.

FIG. 5A is a conceptual top view of a composite a central layer of a composite central layer for an antimicrobial roll-up floor cover.

FIG. 5B is a conceptual top view of a composite a central layer of a composite central layer for an antimicrobial roll-up floor cover.

DETAILED DESCRIPTION

Figure 2:
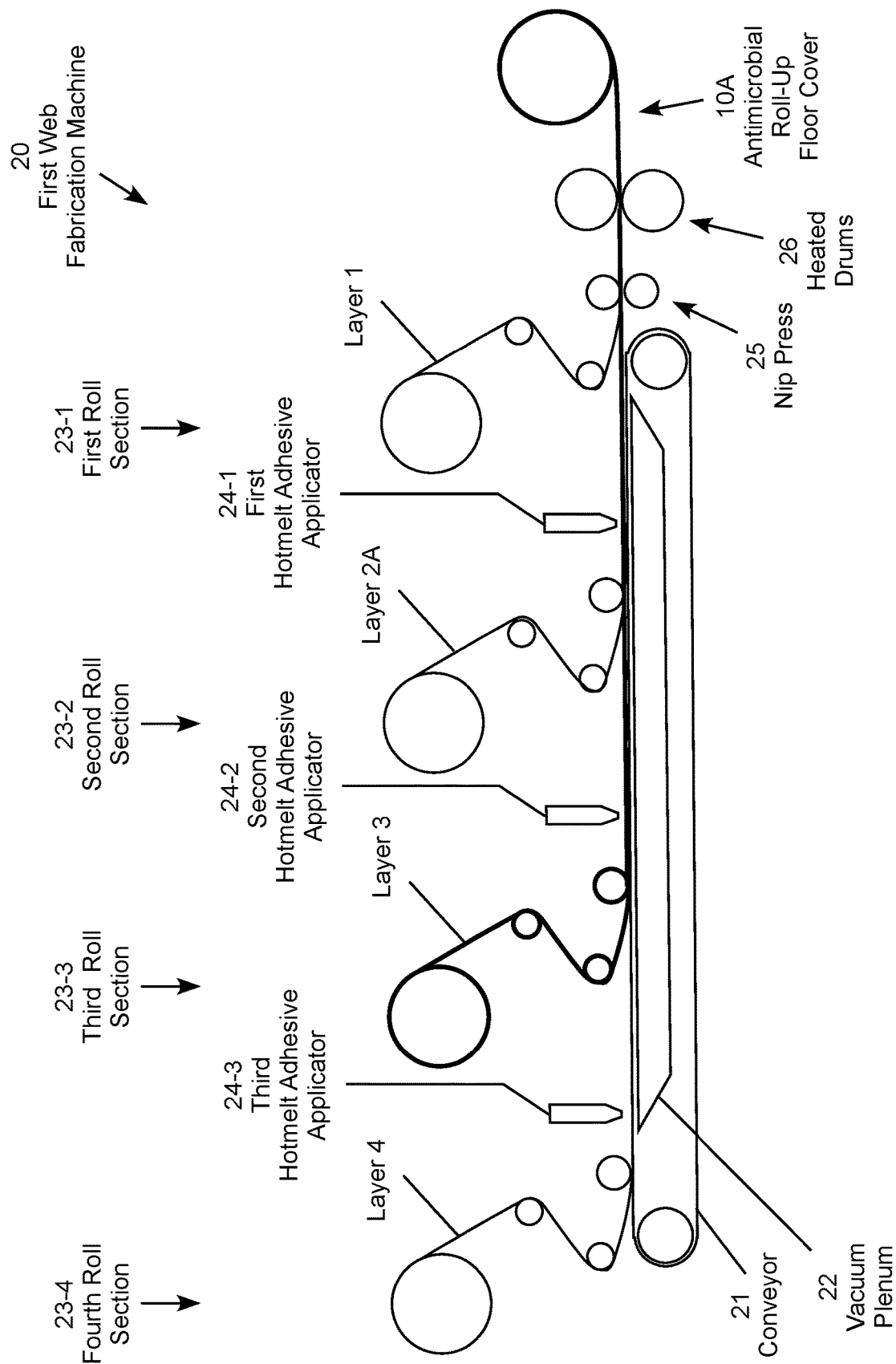
FIG. 2 is a conceptual process diagram of a first web fabrication machine for manufacturing an antimicrobial roll-up floor cover.

Embodiments of the invention may be realized in a temporary roll-up floor cover and a method for manufacturing the floor cover. The floor cover includes a rugged upper layer that is impervious to water and pervious water vapor, and a lower antimicrobial wicking layer that quickly spreads water while transmitting water vapor to facilitate evaporation of moisture that gets under the cover. The cover may also include a central layer that includes one or more of a microporous membrane, a coating or film layer which may be perforated, and a stiffener lattice that resists folding, gathering and puckering without preventing the cover from rolling up. The coating layer adds additional resistance to folding, gathering and puckering without preventing the cover from rolling up. The coating may be perforated to increase water vapor transmission through the cover. One or more antimicrobial agents may be incorporated into the wicking layer during extrusion of the airlaid mat forming the wicking layer. Antimicrobial agents may be additionally or alternatively included in one or more additional places within the cover, such as sprayed onto one of more of the layers as the layers are brought together in a web fabrication process.

In a specific representative example, the rugged upper layer is fabricated from woven polypropylene exhibiting a weight in the range of 6 to 10 ounces per square yard, the central second layer is a microporous membrane fabricated from expanded PTFE exhibiting a weight in the range of 0.5 to 1.5 ounces per square yard. The lower wicking layer is fabricated from an airlaid mat that incudes cellulose fluff pulp and binder fibers exhibiting a weight in the range of 4.0 to 7.5 ounces per square yard, for example similar to the airlaid mat described in McDonald, U.S. Pat. No. 7,572,525, which is incorporated by reference. As an option, the cover may include a scrim fourth layer next to the wicking third layer fabricated from woven or nonwoven polypropylene, cotton, fiberglass, polyester or blend exhibiting a weight in the range of 0.5 to 3.0 ounces per square yard. As another option, the central layer may have a coating, such as a polyurethane coating, which may be perforated to increase transmission of water vapor.

As another option, the central layer may also include a stiffener lattice positioned between the microporous membrane and the wicking layer. The stiffening lattice may include cross members with lengths in the range of 4 to 10 inches, widths in the range of 0.125 to 0.25 inches, and thicknesses in the range of 0.0625 to 0.125 inches fabricated from polycarbonate, high density polyethylene (HDPE), acrylonitrile butadiene styrene (ABS), or Nylon. The antimicrobial agents may include one or more of thiazolylbenzimidazole (TBZ), quaternary ammoniums (QACs or quats), silane QACs (si-quats), n-halamines, isothiazolinone, tiabendazole, polyhexamethylene biguanide (PHMB), triclosan, chitosan, sodium percarbonate, calcium hypochlorite, and metals compounds, such as metal salts (e.g., salts of Ag, Ti, Zn, Cu, etc.), zinc pyrithione, silver zeolite, silver zirconium phosphate, silver zirconium phosphate silicate, silver nitrate, copper sulfate, zinc nitrate, silver chloride, copper chloride, zinc chloride.

FIG. 1A through FIG. 1-G are conceptual side views of a variety of temporary antimicrobial roll-up floor cover designed for sterile or other locations where antimicrobial features are desired. These floor covers as particularly well suited to temporary "pop-up" medical facilities, temporary military medical facilities, hospitals, clinics, offices, schools, athletic surfaces, and the like. As different features may be preferred for different situations, a number of different embodiments are shown with different feature sets. For example, certain embodiments that include a stiffener lattice that inhibits folding, gathering and puckering under wheeled devoices are well suited to hospital, clinic and office environments where wheeled devices will be expected to roll on top of the cover with the wheels jamming. Other embodiments without a stiffener lattice are designed to be less expensive and amenable to folding. These options are well suited to serving as antimicrobial drop cloths, automobile repair floor covers, exercise covers, and so forth. With a range of products available to choose form, various users will be able to select the products that best meet their feature needs and budgets.

FIG. 1.1 is a conceptual side view of a first antimicrobial roll-up floor cover 10.1 rolled out on a floor 11. This is the simplest of the floor cover alternatives including a rugged upper layer 1 and a lower antimicrobial wicking layer 3. In a representative embodiment, the rugged upper layer 1 is fabricated from a woven polypropylene sheet and the wicking layer 3 is fabricated from an airlaid mat, as described in more detail below. The rugged upper layer 1 provides durability allowing the cover to be reused multiple times, while the antimicrobial wicking layer 3 soaks up and spreads out (wicks) water, while preventing microbial growth, such as mold, mildew, bacteria and viruses. The rugged upper layer 1 is impervious to water (waterproof) while readily passing water vapor (permeable to water vapor), also referred to as "breathable," allowing the cover 10.1 to evaporatively dry if moisture gets under the cover. The rugged upper layer 1 is also impervious to oil, dirt, paint, grime, dust and other contaminants.

FIG. 1.2 is a conceptual side view of an alternative roll-up floor cover 10.2 that is similar to the roll-up floor cover 10.1 except that an additional central layer 2A has been added between layers 1 and 3. In other words, the alternative floor cover 10.2 includes a rugger upper layer 1, a central layer 2A, and a lower antimicrobial wicking layer 3. In a representative embodiment, the central layer 2A is a microporous membrane fabricated from expanded polytetrafluoroethylene (PTFE) often referred by the tradename Teflon®, as described in more detail below. The central layer 2A is a waterproof, breathable membrane adding strength and cushion to the cover while allowing water vapor to permeate through.

FIG. 1.3 is a conceptual side view of another alternative roll-up floor cover 10.3 that is similar to the roll-up floor cover 10.2 except that an additional stiffener layer 2B has been added, with layers 2A and 2B forming a composite central layer 2. This embodiment also includes and anti-snag scrim layer 4 below the wicking layer 3, where it is positioned against the floor 11. In other words, the alternative floor cover 10.3 includes a rugger upper layer 1, a composite central layer 2 that includes a central layer 2A (e.g., expanded PTFE) and a stiffener layer 2B (e.g., polycarbonate lattice), a lower antimicrobial wicking layer 3, and an anti-snag scrim layer 4 on the bottom. The stiffener layer 2B inhibits folding, gathering and puckering under wheeled devices making it suitable for application where wheeled devices will be rolled on top of the cover, such as hospitals, temporary military medical facilities, pop-up clinics, and the like. The stiffener layer 2B is positioned on top of the airlaid mat of the antimicrobial wicking layer 3, which allows it to settle into the airlaid mat, while the central layer 2A passes over the lattice to smooth the rolling surface on top of the cover 10.3.

FIG. 1.4 is a conceptual side view of another alternative roll-up floor cover 10.4 that is similar to the roll-up floor cover 10.3 except that an additional coating or film 2C has been added to the central layer, with layers 2A, 2B and 2C forming a composite central layer 2.1. In other words, the alternative floor cover 10.5 includes a rugger upper layer 1, a composite central layer 2.1 that includes a central layer 2A (e.g., expanded PTFE), a stiffener layer 2B (e.g., polycarbonate lattice) and a coating or film 2C (e.g., polyurethane), a lower antimicrobial wicking layer 3, and an anti-snag scrim layer 4 on the bottom. In a representative embodiment, the central layer 2A has a coating 2C, such as polyurethane applied to the top side of the central layer 2A opposing the bottom side that is adjacent to the stiffener layer 2B, which places the coating or film against the upper layer 1 in this embodiment. The coating or film 2C adds additional strength to the cover 10.4 and smooths over the stiffener lattice 2B. The coating or film layer 2C may have a lower vapor permeability than the other layers of the cover 10.4 and may therefore be perforated to increase the vapor permeability through the layer.

FIG. 1.5 is a conceptual side view of another alternative floor cover 10.5 that is similar to the roll-up floor cover 10.4 except that this embodiment does not include the stiffener layer 2B. In other words, the alternative floor cover 10.5 includes a rugger upper layer 1, a composite central layer 2.2 that includes a central layer 2A (e.g., expanded PTFE) carrying a coating or film 2C (e.g., polyurethane), a lower antimicrobial wicking layer 3, and an anti-snag scrim layer 4 on the bottom.

FIG. 1.6 is a conceptual side view of another alternative floor cover 10.6 that is similar to the roll-up floor cover 10.5 except that this embodiment does not include a microporous membrane (e.g., expanded) PTFE layer or an anti-snag scrim layer, which reduces the cost of the roll-out antimicrobial cover. In this case, a coating or film layer 2C, such as polyurethane, is positioned between the upper layer 1 and the stiffener layer 2B. In other words, the alternative floor cover 10.6 includes a rugger upper layer 1, a composite central layer 2.3 that includes stiffener layer 2B (e.g., polycarbonate lattice) and a coating or film layer 2C (e.g., polyurethane), and a lower antimicrobial wicking layer 3 on the bottom.

FIG. 1.7 is a conceptual side view of another alternative floor cover 10.7 that is similar to the roll-up floor cover 10.6 except that this embodiment does not include the a coating or film layer. In other words, this particular alternative floor cover 10.7 includes a rugger upper layer 1, a central stiffener layer 2B (e.g., polycarbonate lattice), and a lower antimicrobial wicking layer 3 on the bottom.

In a representative embodiment, the rugged upper layer 1 is fabricated from woven polypropylene, and the central layer 2A is fabricated from microporous expanded polytetrafluoroethylene (PTFE) often referred by the tradename Teflon®. The wicking layer 3 is fabricated from cellulose fluff pulp with bi-component binder fibers and other additives, such ethylene vinyl acetate or latex, to improve binding of the airlaid mat. The anti-snag scrim layer 4 may be a commercially available lightweight woven or nonwoven polypropylene, cotton, fiberglass, polyester or blend scrim material.

In the representative embodiment, the rugged upper layer 1 and the central layer 2A are waterproof and pervious to water vapor, while the scrim layer 4 and the wicking layer 3 are pervious to water and water vapor. The rugged upper layer 1, the central layer 2A, the wicking layer 3, and the scrim layer 4 have a relatively high permeability to water vapor allowing the cover to dry evaporatively when it gets wet. The wicking layer 3 absorbs and quickly spreads water to facilitate evaporative drying. The wicking layer 3 also includes one or more antimicrobial agents to mitigate microbial growth within or under the cover.

In another representative embodiment, a composite central layer 2 includes a coating or film layer 2B on the central layer 2A, such as an expanded PTFE microporous membrane. Spraying a coating or adhering film, such as polyurethane, to the central layer adds strength to the roll-out antimicrobial cover, but may reduce vapor permeability through the cover. The coating or film layer 2B may therefore be perforated to increase vapor permeability through the layer. During a web fabrication process, the composite central layer 2 may pass through a drying unit to dry the polyurethane coating prior to perforation. The drying unit described in the specification may utilize one or more of infrared heaters, hot air convection, extended sinuous web paths, heated rollers, or other suitable web drying techniques.

Adhering the layers together stiffens the roll-out antimicrobial cover to mitigate gathering, folding or puckering when wheeled devices, such as forklifts, air compressors, gurneys, medical equipment and the like are rolled over the floor cover, which could otherwise jam or trip the wheels or damage the cover. Adding a polyurethane coating to the central layer further stiffens the roll-out antimicrobial cover for this purpose. An additional stiffener layer, such as a plastic lattice located above the wicking layer 3, may be included to provide additional resistance to gathering, folding or puckering without impeding rolling up the cover. For example, polycarbonate, high density polyethylene (HDPE), acrylonitrile butadiene styrene (ABS), or Nylon plastic lattice are illustrative choices for the plastic stiffener layer. An illustrative stiffener layer may include, for example, a square, rectangular or rhomboidal lattice including cross members with lengths in the range of 4 to 10 inches, widths in the range of 0.125 to 0.25 inches, and thicknesses in the range of 0.0625 to 0.125 inches. Locating the plastic stiffener lattice above the wicking layer allows the stiffener lattice to settle into the airlaid mat forming the wicking layer with the central layer (or composite central layer) passing over the lattice to smooth the rolling surface on top of the rugged upper layer to resist gathering, folding or puckering without impeding rolling up the cover. This makes roll-out antimicrobial cover an effective surface for wheeled devices, while providing for much easier and faster "rolling out" and "rolling up" in comparison to tile or panel temporary flooring options.

In a representative embodiment, the rugged upper layer 1 is a heavy duty tarp material, similar to conventional construction cover, selected to protect the underlying floor from fork lift operations, material staging, scaffolding, and other construction activities. The rugged upper layer 1 should prevent water, oil, paint, grime and dust from penetrating through. The rugged upper layer 1 may be a woven material, such as high density woven polypropylene or polyethylene, with a relatively high permeability to water vapor. In a specific example embodiment, the rugged upper layer 1 may be fabricated from woven polypropylene exhibiting a weight in the range of 6-10 ounces per square yard, and the central layer 2A may be a microporous membrane fabricated from expanded PTFE. In a representative embodiment, the central layer 2A is a microporous membrane of expanded PTFE exhibiting a weight in the range of 0.5 to 1.0 ounces per square yard. The weight will be somewhat higher, such as 1.0-1.5 ounces per square yard in embodiments with a coating or film layer 2C. Layers with thicker coating or multiple coating layers may have higher weights.

The wicking layer 3 is typically fabricated by an airlaid process. The term "airlaid" generally refers to a fibrous structure formed primarily by a process involving extrusion of air-entrained fibers onto a mat, typically along with binder fibers, usually followed by densification and thermal bonding. In addition to traditional thermally bonded airlaid structures with bicomponent binder fibers, those formed with non-tacky binder materials and bonding techniques other than bicomponent binder fibers set by thermal bonding may be used. For example, binder additives, such as latex, may be used in addition to or instead of bicomponent binder fibers.

To provide additional illustrative examples, the term "airlaid," also includes "co-formed" mats, which are produced by combining air-entrained dry, dispersed cellulosic fibers with melt blown synthetic polymer fibers while the polymer fibers are still tacky. "Airlaid" also includes an "airformed" web to which one or more binder materials are added after extrusion. Binders may be added by extrusion melting, spray nozzles, direction injection or impregnation, vacuum drawing, foam impregnation, and so forth. Solid binder powders, prills, fibers, liquid or gels also may be included in the airlaid mixture prior to extrusion, or they may be added during or after extrusion by mechanical, pneumatic, or any other suitable technique.

In a particular embodiment, the wicking layer 3 contains bi-component or multibond fibers, fluff cellulose pulp, ethylene vinyl acetate, and latex. In a representative example, about 5-50%, preferably about 30%, of the fibers are synthetic bonding fibers. Synthetic fibers contribute as much as 3.8-4.25%, preferably about 4%, by weight to the airlaid wicking layer. Bi-component and multibond fibers are coaxial fibers having an inner component with a higher melting temperature than an encasing outer component. When heated, the outer component melts for bonding with other elements, while the inner component does not melt, thus lending integrity and strength to the bonded material. The inner and outer components may be selected from polypropylene, polyethylene or other compositions suitable for the purposes described.

The wicking layer 3 may also include 50-89%, preferably about 50%, natural cellulose fluffed pulp fiber. The fluff pulp may be derived from southern softwood, northern softwood, southern hardwood, northern hardwood, kanaf or eucalyptus fibers. These materials provide short fibers that offer great surface area for trapping and absorbing water. The fibers derived from protein based, cotton, agave, plant stalk (bast) fibers of other mats tend to be much longer, hence afford less surface area for trapping and absorbing water. These longer fibers also generally have waxes, resins and some lignin present that discourage entrapping water. These longer fibers are typically less absorbent and exhibit geometries that are not as favorable as natural cellulose fluff fabricated from soft and/or hardwood fibers. Further, the natural pulp fibers also tend to provide greater tensile strength than the fibers of other mats.

The fluff pulp for the wicking layer 3 may be obtained from a Kraft process, rather than mechanical pulping. Mechanical pulping typically does not produce a clean product, free of the waxes, resins, silicone, turpentine and other undesired components present in the virgin natural wood materials. Bleached Kraft pulp provides the best known absorption capabilities by producing clean cellulose. The Kraft process also produces a bulkier cellulose with a white absorptive component that prevents discoloration of a concrete surface, such as the discoloration that commonly occurred with "burlap style" concrete curing blankets. Certain additives, such as ethylene vinyl acetate and latex, add strength and reduce dusting.

One or more bonding agents, such as ethylene vinyl acetate and latex, may be added into the airlaid mixture prior to extrusion, sprayed onto the airlaid mat during or after extrusion, or they may be applied to the natural fibers or form part of the bi-component or multibond fibers prior to the airlaid mat fabrication process. The bonding agents aid in strengthening the adhesion among the bi-component or multibond fibers and other materials in the wicking layer 3. The bonding agents may contribute as much as 5-35%, preferably about 20%, by weight. Another embodiment of the wicking layer 3 contains 5-20% super absorbent fibers. Super absorbent fibers are absorbent fibers coated with an absorbent material.

The wicking layer 3 may be thermally bonded to a backing and may include a laminated, extruded or coated polyethylene or polymer latex material. For example, the latex material formed into or sprayed onto the airlaid mat may be a two-part composition that renders it insoluble in water. The water insolubility of the latex discourages disintegration of the airlad mat when it gets wet. As an option, the airlaid mat may be spray coated with latex, which lowers production costs.

One part of the latex composition may be a high-viscosity polymer filler agent, while the other part may be a water resistant agent obtained by polymerization. A binder dispersed in water forms films by fusion of the plastic filler particles as the water evaporates during manufacturing or curing. The wicking layer 3 may be bonded together with a water resistant adhesive having a softening point of 21 degrees Fahrenheit. In a representative embodiment, the wicking layer 3 may have a weight in the range of 4.0 to 7.5 ounces per square yard.

The airlaid fabrication of the wicking layer 3 can tend to snag when dragged across a floor or other surface. Since the roll-out antimicrobial cover is designed for reuse two, three or more times, it may justify adding an optional scrim layer 4 under the wicking layer to prevent snagging. The scrim layer 4 should be a relatively thin, light and slick layer selected to minimize snagging. In an particular embodiment, the scrim layer 4 may be a woven or nonwoven polypropylene, cotton, fiberglass, polyester or blend scrim material exhibiting a weight in the range of 0.5 to 3.0 ounces per square yard that is highly pervious to water and water vapor.

In an illustrative embodiment, the roll-out antimicrobial cover also includes hotmelt thermoplastic adhesive with a melting point of about 210 degrees Fahrenheit applied between the layers of roll-out antimicrobial cover. The hotmelt adhesive may be applied in strips, sinuous strips, dashes or dots occupying only a small fraction of the area of the cover to avoid blocking water vapor transmission through the cover.

As an option, one or more antimicrobial agents may be incorporated into or applied to one or more of the layers. In particular, the wicking layer 3 may include one or more antimicrobial agents, which may be applied to the wicking layer in several different ways. The antimicrobial agents typically include an antifungal agent to prevent or reduce mold and mildew growth. The antimicrobial agents may also include an antibacterial agent to prevent or reduce bacterial and viral growth. The antimicrobial agents are typically incorporated into the wicking layer during the airlaid mat fabrication process by adding the agents to the airlaid mixture prior to extrusion. Additionally or alternatively, they may be incorporated into the wicking or binder fibers through a pre-treatment applied prior to the airlaid mat formation process. Tsubai et. al, U.S. Pat. No. 5,888,526 and Ghosh et al., U.S. Pat. No. 7,846,856, which are incorporated by reference, describe pre-treatment processes for incorporating or apply the antimicrobial agents to the pulp or binder fibers prior to formation of the airlaid mat. Additionally or alternatively, antimicrobial agents in liquid or powder format may be applied (e.g., spread as a powder, sprayed as a liquid) to any layer or between any layers after extrusion of the airlaid mat during web fabrication of the roll-out antimicrobial cover. The web may pass through a drying unit to dry, bind or activate any antimicrobial agent(s), binder fibers and other adhesives prior to rolling the finished concrete cover.

Since the roll-out antimicrobial cover is expected to be left in place for an extended period, an antifungal agent selected to reduce or prevent mold and mildew is particularly desirable. Antibacterial agents selected to reduce or prevent bacterial and viral growth may also be included, which may be particularly desirable for hospitals, temporary medical facilities, temporary military medical facilities, virus inoculation sites, clinics, schools, offices, homes, athletic facilities. Although any antimicrobial agent found to be effective may be utilized, representative antimicrobial agents include thiazolylbenzimidazole (TBZ), quaternary ammoniums (QACs or quats), silane QACs (si-quats), n-halamines, isothiazolinone, tiabendazole, polyhexamethylene biguanide (PHMB), triclosan, chitosan, sodium percarbonate, calcium hypochlorite, and metals compounds, such as metal salts (e.g., salts of Ag, Ti, Zn, Cu, etc.), zinc pyrithione, silver zeolite, silver zirconium phosphate, silver zirconium phosphate silicate, silver nitrate, copper sulfate, zinc nitrate, silver chloride, copper chloride, zinc chloride.

In general, the antimicrobial agents should be added in quantities found to be effective. Antimicrobial agents may be introduced in powder form, or dissolved in water, alcohol or another solvent, as appropriate. Antimicrobial agents may also or alternatively be introduced in polymer liquid or pellet form. The agents may be added directly into the airlaid fiber mixture prior to extrusion during the airlaid web formation process. Powdered additives may be dissolved to prevent clogging the extruder. For example, selected agents may be applied individually or in combination contributing 2,500 to 10,000 parts per million (PPM) (0.25% to 1.0% by weight) of the wicking layer 3. A specific illustrative embodiment includes zinc pyrithione contributing 1,000 to 5,000 PPM of the wicking layer 3. Another specific example includes equal parts silver nitrate, copper sulfate, and zinc nitrate with a combined contribution of 1,000 to 10,000 PPM of the wicking layer 3.

Since tiabendazole (TBZ) is not water soluble, it is typically dissolved in alcohol or another solvent prior to adding it to the airlaid mixture prior to extrusion, which may additionally or alternatively be sprayed onto the airlaid mat or another layer after extrusion. Care should be taken to properly limit the amount of alcohol or another solvent used because other components of the airlaid mat or the hotmelt adheisive may also be dissolved by the solvent. For example, it may be suitable to limit the amount of TBZ solute to 500 to 2,500 PPM of the wicking layer. It should also be appreciated that adding TBZ solute may help to soften the airlaid mixture to facilitate extrusion, for example when other agents are added in powder form, such as zinc pyrithione or metal compounds, such as metal salts (e.g., salts of Ag, Ti, Zn, Cu, etc.), zinc pyrithione, silver zeolite, silver zirconium phosphate, silver zirconium phosphate silicate, silver nitrate, copper sulfate, zinc nitrate, silver chloride, copper chloride, zinc chloride. The mixture of antimicrobial agents in various embodiments will therefore vary depend on the quantities, types and formats of the agents selected, and should be selected carefully when adding the agents to the airlaid mixture prior to extrusion. Adding one or more antimicrobial agents to the airtlaid mixture prior to extrusion is presently considered the primary treatment approach. Water soluble agents are preferred for spray application to avoid adding solvents that may adversely impact the hotmelt glue applied between the layers of the cover.

FIG. 2 is a conceptual process diagram of a first web fabrication machine 20 for manufacturing a first roll-out antimicrobial cover 10A, which includes layers 1, 2, 3 and 4. The illustrative machine 20 includes a conveyor 21 and a vacuum plenum 22 typically utilized in web fabrication. A first roll section 23-1 unrolls the rugged upper layer 1 on the top of the web carried by the conveyor 21. A second roll section 23-2 unrolls the central layer 2 onto the web under the rugged upper layer 1. A third roll section 23-3 unrolls the wicking layer 3 onto the web under the central layer 2. A fourth roll section 23-4 may be included to unroll the scrim layer 4 onto the web under the wicking layer 3. Layers or layer components may be omitted or added, as desired, to manufacture the alternative floor covers. For example, the fourth roll section 23-4 may be omitted for embodiments that do not include a scrim layer 4. A single-ply central layer or various composite central layers may be introduced by the second roll section 23-2, as desired. In other embodiments, one or more components of a composite central layer may be applied or the web by different roll sections, such as one roll section for a polyurethane film layer, another roll section for an expanded PTFE membrane layer, and another roll section for a stiffener layer.

A first hotmelt adhesive applicator 24-1 applies an adhesive between layer 1 and layer 2, and a second hotmelt adhesive applicator 24-2 applies an adhesive between layer 2 and layer 3. If a scrim layer 4 is included a third hotmelt adhesive applicator 24-3 applies an adhesive between layer 3 and layer 4. After the layers are brought together, they pass through a nip press 25 and may pass between heated drums 26 if heated compression of the cover is desired before the roll-out antimicrobial cover is spooled into a roll.

Figure 3:
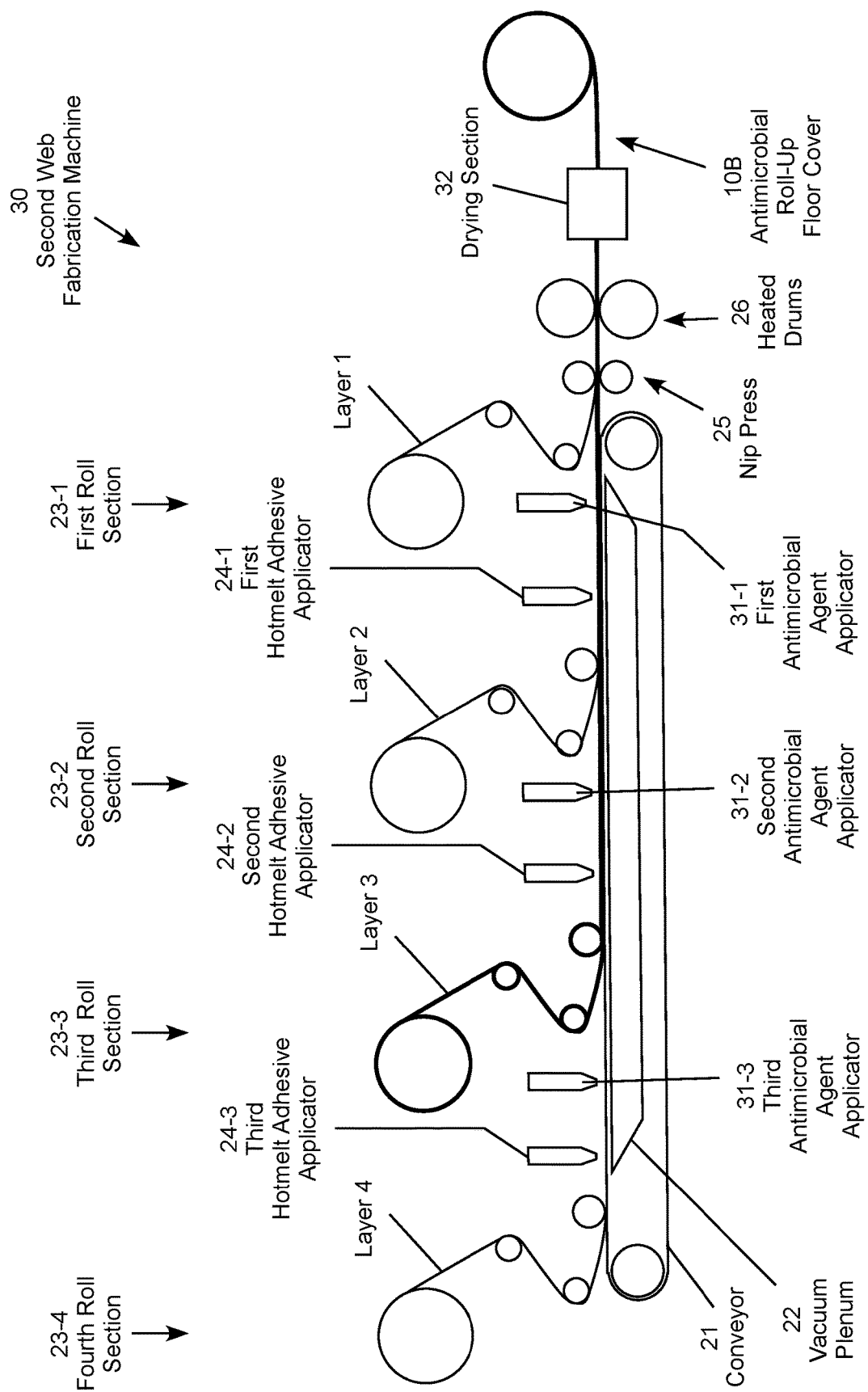
FIG. 3 is a conceptual process diagram of a second web manufacturing machine for fabricating an antimicrobial roll-up floor cover.

FIG. 3 is a conceptual process diagram of a second web manufacturing machine 30 for fabricating an antimicrobial roll-up floor cover 10B. The second web manufacturing machine 30 is similar to the first web manufacturing machine 20 except that one or more antimicrobial agent applicators have been added to apply antimicrobial agents between layers. In this example, a first antimicrobial agent applicator 31-1 applies one or more antimicrobial agents between layer 1 and layer 2, a second antimicrobial agent applicator 31-2 applies one or more antimicrobial agents between layer 2 and layer 3, and a third antimicrobial agent applicator 31-3 applies one or more antimicrobial agents between layer 3 and layer 4. The antimicrobial agent applicator may spread in powder form, spray in liquid for, roll, brush or use another suitable process to apply the agent. The web may pass through an additional drying section 32 if additional drying is required. Other than incorporating the antimicrobial agents into the airdlid mat during the mat formation process, spray application of agents in liquid form is generally considered to be the most economical and effective additional or alternative treatment approach.

Figure 4:
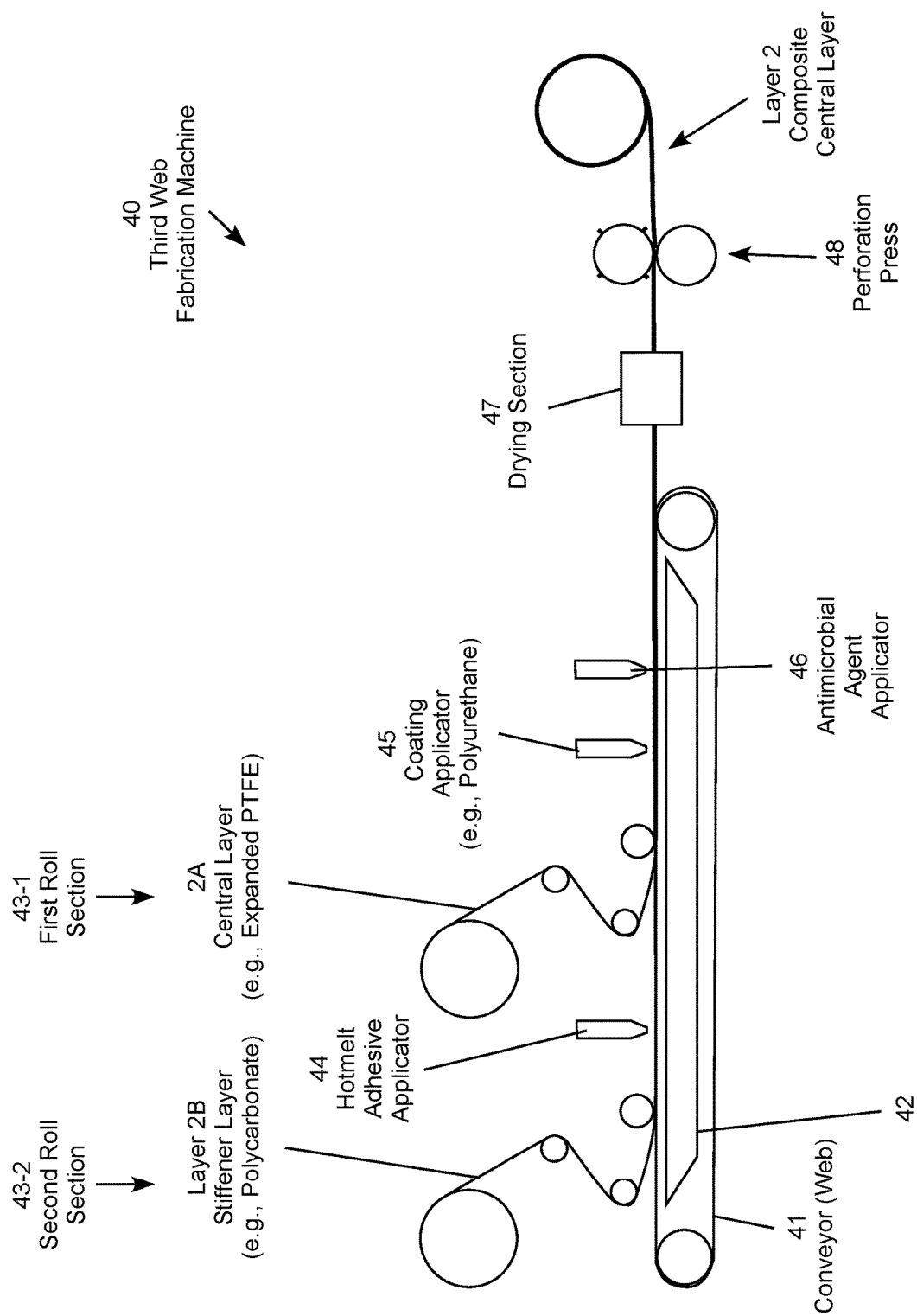
FIG. 4 is a conceptual process diagram of a third web fabrication machine for manufacturing a composite central layer for an antimicrobial roll-up floor cover.

FIG. 4 is a conceptual process diagram of a third web fabrication machine 40 for manufacturing a composite central layer 2. The machine 40 includes a conveyor 41 and a vacuum plenum 42 typically utilized in web fabrication. A first roll section 43-1 unrolls a central layer 2A, such as microporous membrane of expanded PTFE, onto the conveyor 41. A first roll section 43-2 unrolls a stiffener layer 2B, such as a polycarbonate lattice, onto the conveyor 41 under the central layer 2A. A hotmelt adhesive applicator 44 applies an adhesive between layer 2A and layer 2B. In this example embodiment, a coating applicator 45 applies a coating of a strengthening material, such as polyurethane, onto the central layer 2A. The applicator 45 may spray, roll, brush or use another suitable process to apply the coating. In an alternative embodiment, the applicator 45 may be replaced by a roll section that unrolls a film layer onto the web carried on the conveyor, and a second hotmelt glue applicator may apply and adhesive between the film layer and the web. The web may pass through an additional drying section 47 if additional drying is required. To increase vapor permeability, the coated mat may then pass through a perforation press 48 to perforate the coating or film layer FIG. 5A is a conceptual top and FIG. 5B is a conceptual side view of the composite central layer 2. The perforation press 48 shown in FIG. 4 leaves a repeat pattern of perforations represented by the vapor pores 51 called out in FIGS. 5A and 5B through the coating or film layer 2C, such as a polyurethane coating or film layer. The coating or film layer may be eliminated, or the thickness of the coating or film layer may be adjusted, or the number or size of the perforations may be adjusted to obtain a cover with a desired vapor permeability. A selection of different covers with different vapor permeabilities may be fabricated by varying these features.

Figure 6:
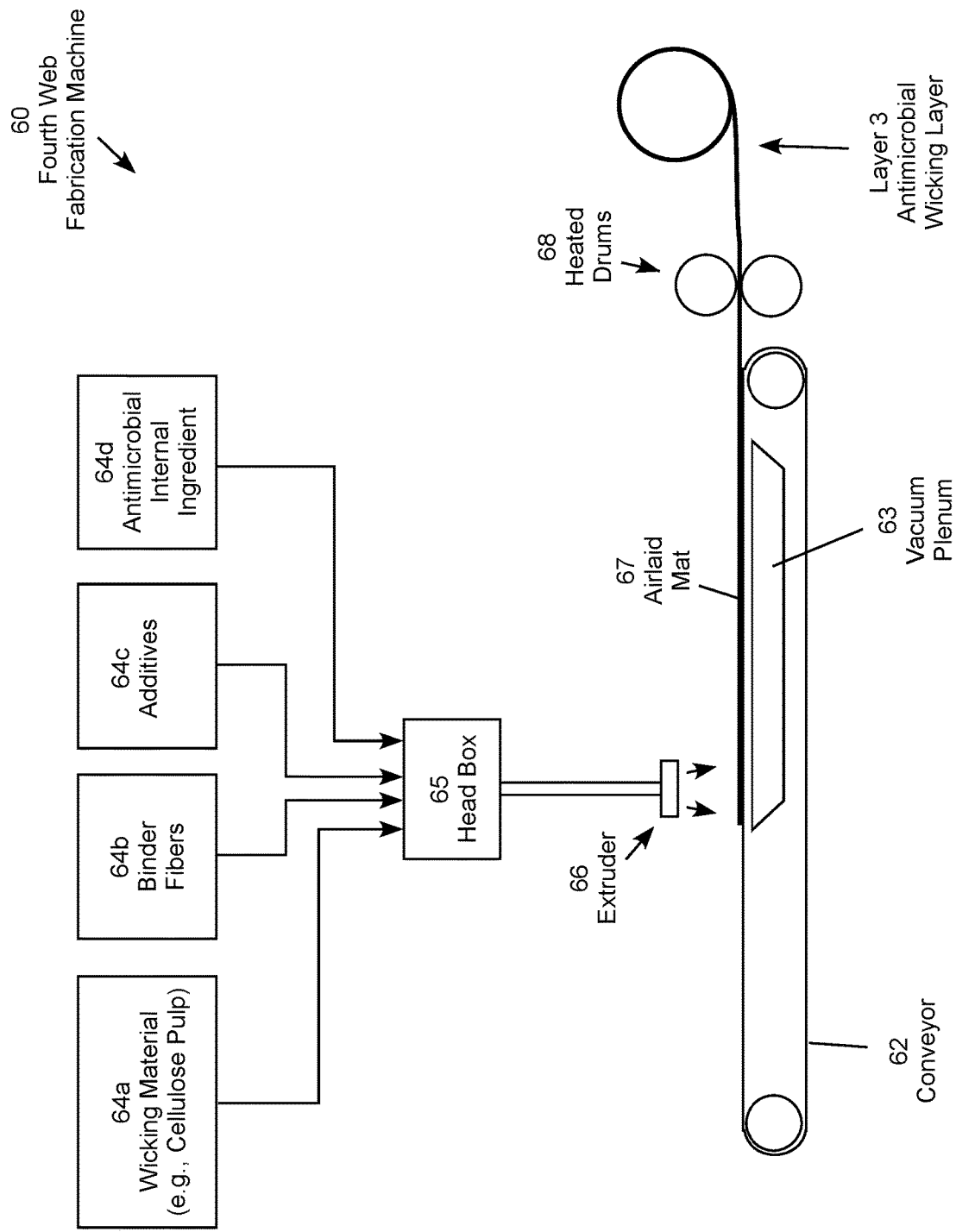
FIG. 6 is a conceptual process diagram of a fourth web fabrication machine for manufacturing an antimicrobial wicking layer for an antimicrobial roll-up floor cover.

FIG. 6 is a conceptual process diagram of a fourth web fabrication machine 60 for fabricating an antimicrobial wicking layer 3. The machine 60 includes a conveyor 62 and a vacuum plenum 63 typically utilized in web fabrication. In this particular example, a wicking material (e.g. cellulose fluff pulp) 64a, binder fibers 64b (e.g., bi-component polymer fibers), additives 64c (e.g., ethylene vinyl acetate, latex) and other desired components of a conventional airtlaid mat are brought together into an extruder head box 65. According to an aspect of the invention, one or more antimicrobial internal ingredients 65c are introduced directly into the extruder head box 65, which incorporates the antimicrobial internal ingredients into the airlaid material as it is heated and forced through an extruder 66 onto the conveyor 62 forming a airlaid mat 67. The vacuum plenum 63 draws air through the airlaid mat 67 to dry the mat, which passes between heated drums 68 to compress, set binders, and further dry the mat.

As shown in FIG. 6, impregnating the antimicrobial agents into the wicking layer 3 is considered to be the most effective place to incorporate the antimicrobial agents into the cover because the wicking layer is designed to absorb and spread water, which is generally considered necessary for growth of microbes, such as mold, mildew, bacteria and viruses. Introducing the antimicrobial agents into the head box 65 during the airlaid mat formation process is also as efficient way to incorporate the antimicrobial agents into the cover because it avoids the need of additional applicators, dryers or other processes. Nevertheless, antimicrobial agents can alternatively or additionally be applied to the airlaid mat after extrusion or to other layers. Additionally or alternatively, any or all of layer may incorporate or be pre-treated with antimicrobial agents prior to web formation of the cover.

Figure 7:
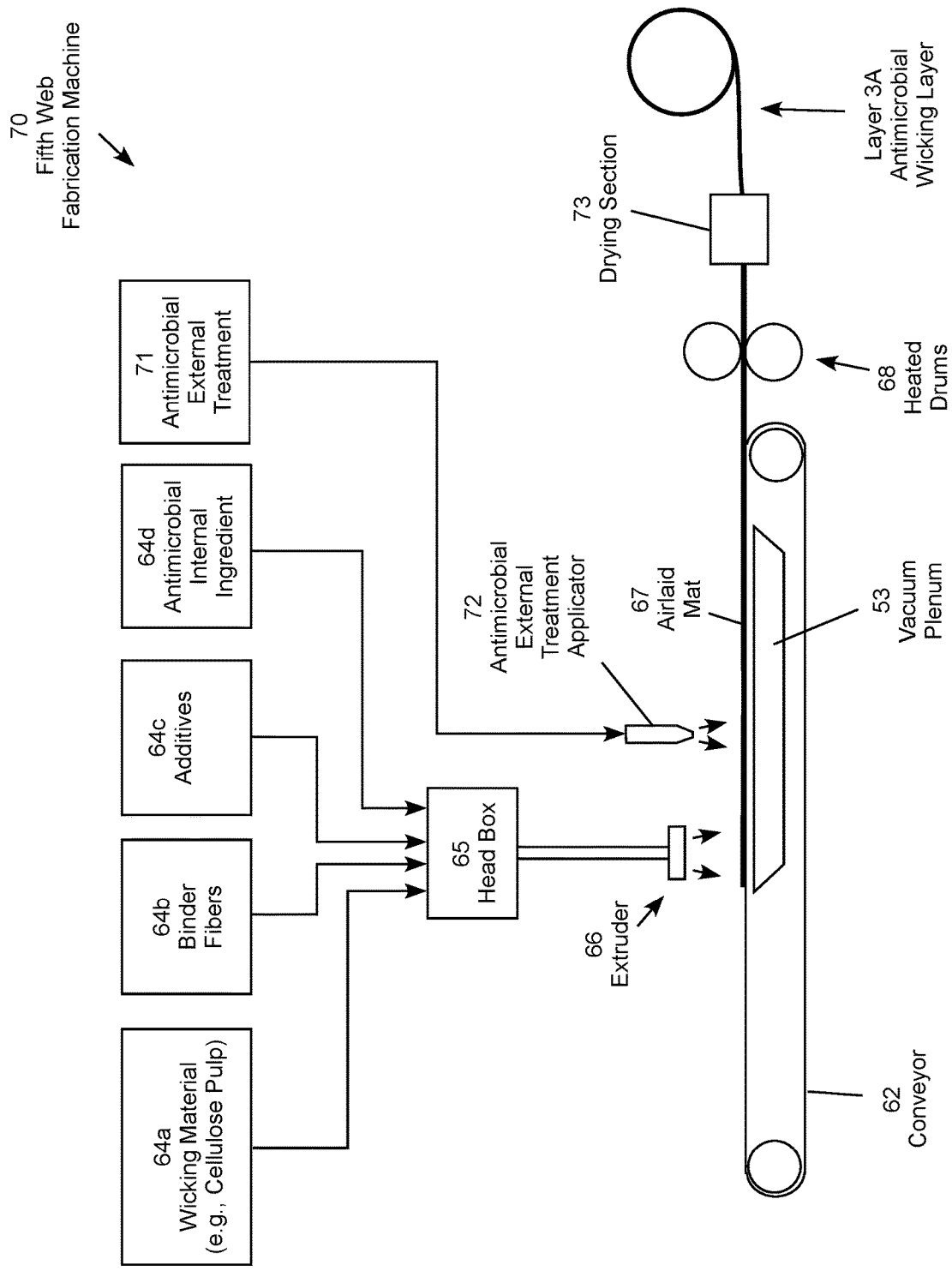
FIG. 7 is a conceptual process diagram of a fifth web fabrication machine for manufacturing an antimicrobial wicking layer for an antimicrobial roll-up floor cover.

For example, FIG. 7 is a conceptual process diagram of a fifth web fabrication machine 70 to fabricate an alternative antimicrobial wicking layer 3A. The machine 70 is similar to the fourth web fabrication machine 60 shown in FIG. 6, except that an additional or alternative applicator 72 has been added to apply an antimicrobial external treatment 71 to the wicking layer 3A. The applicator 72 spreads one or more agents in powder form, sprays one or more agents in liquid form, or may roll, brush or use another suitable application technique. The airlaid mat 67 may also pass through an additional drying section 73 to apply additional drying before the layer 3A is rolled up, for example when the antimicrobial external treatment 71 is applied in liquid form.

Figure 8:
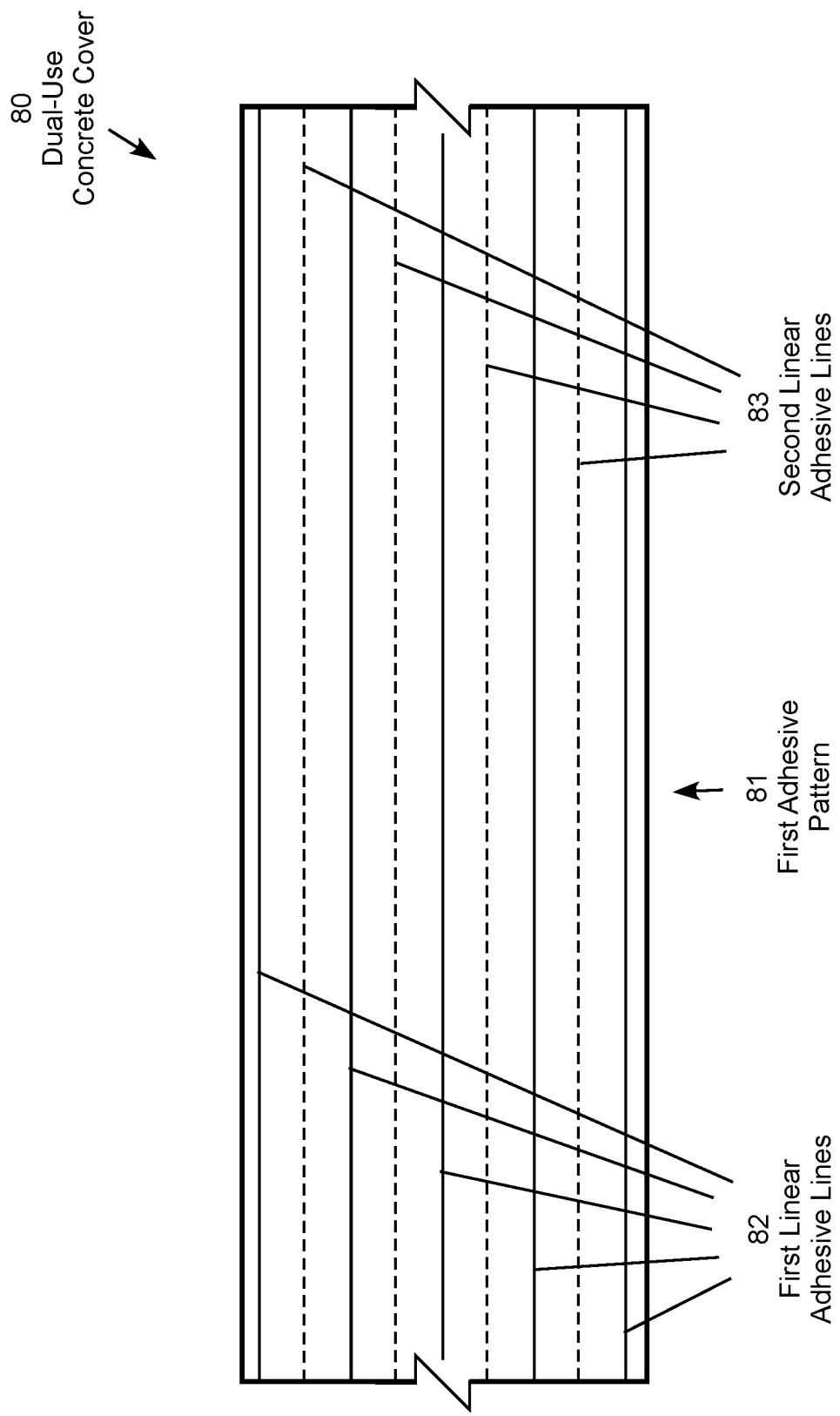
FIG. 8 is a conceptual top view of a first adhesive pattern for a roll-up floor cover.
Figure 9:
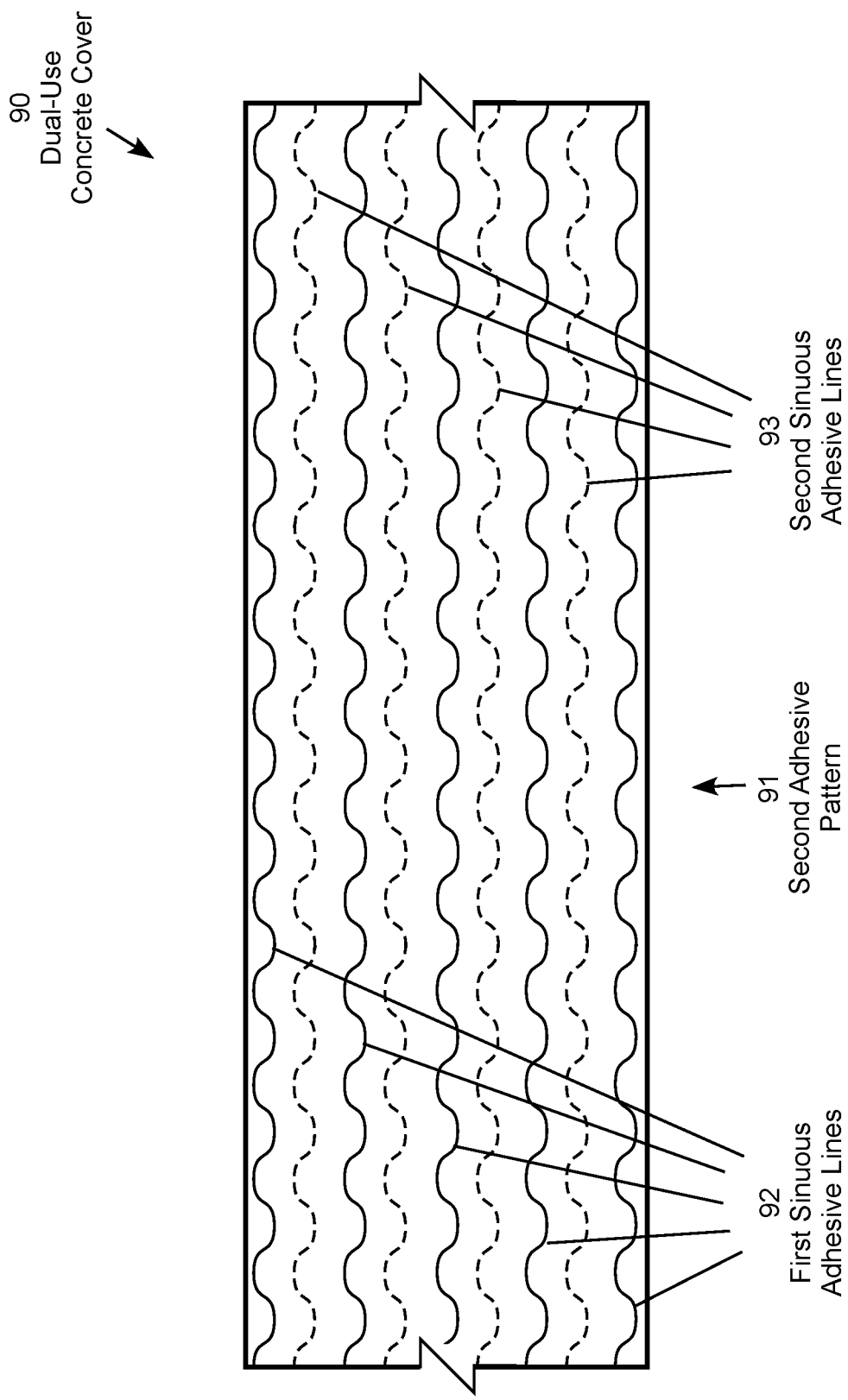
FIG. 9 is a conceptual top view of a second adhesive pattern for a roll-up floor cover.

The hotmelt adhesive should be applied in thin lines, dashes or dots to minimize interference with vapor dissipation through the cover. In a specific representative example, FIG. 8 is a conceptual top view of a first adhesive pattern 80 including first linear adhesive lines 81 (shown in solid lines) between layers 1 and layer 2, which are offset from second linear adhesive lines 82 (shown in dashed lines) between layers 2 and layer 3. In this example, the adhesive lines 81 and 82 may be continuous, line segments or lines of dots in the longitudinal (machine) direction. FIG. 9 shows an example second adhesive pattern 90 including first sinuous adhesive lines 91 (shown in solid lines) between layers 1 and layer 2, which are offset from second sinuous adhesive lines 92 (shown in dashed lines) between layers 2 and layer 3. Again in this example, the adhesive lines 91 and 92 may be may be continuous, line segments or lines of dots in the longitudinal (machine) direction.

Figure 10:
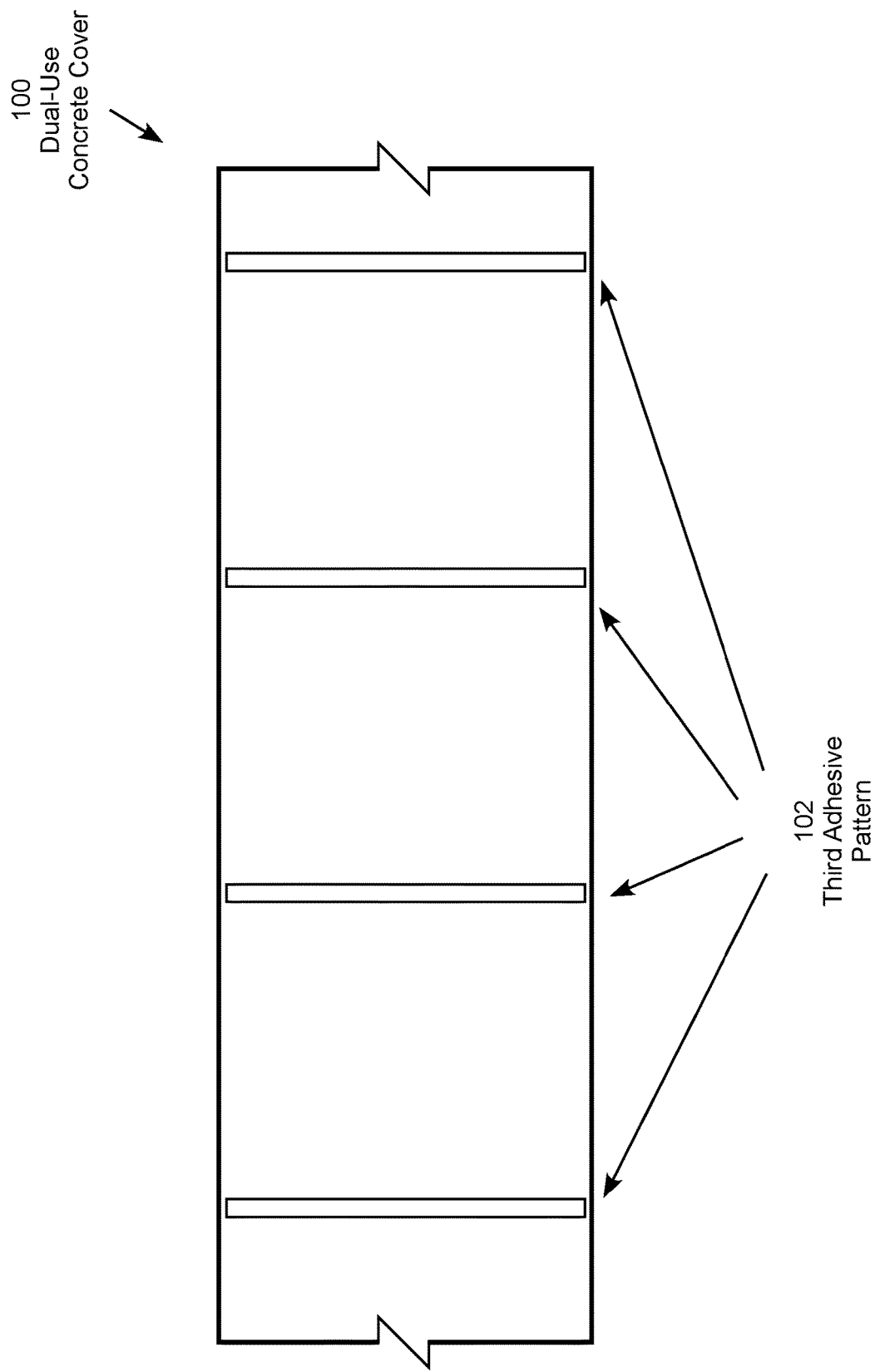
FIG. 10 is a conceptual top view of a third adhesive pattern for a roll-up floor cover.
Figure 11:
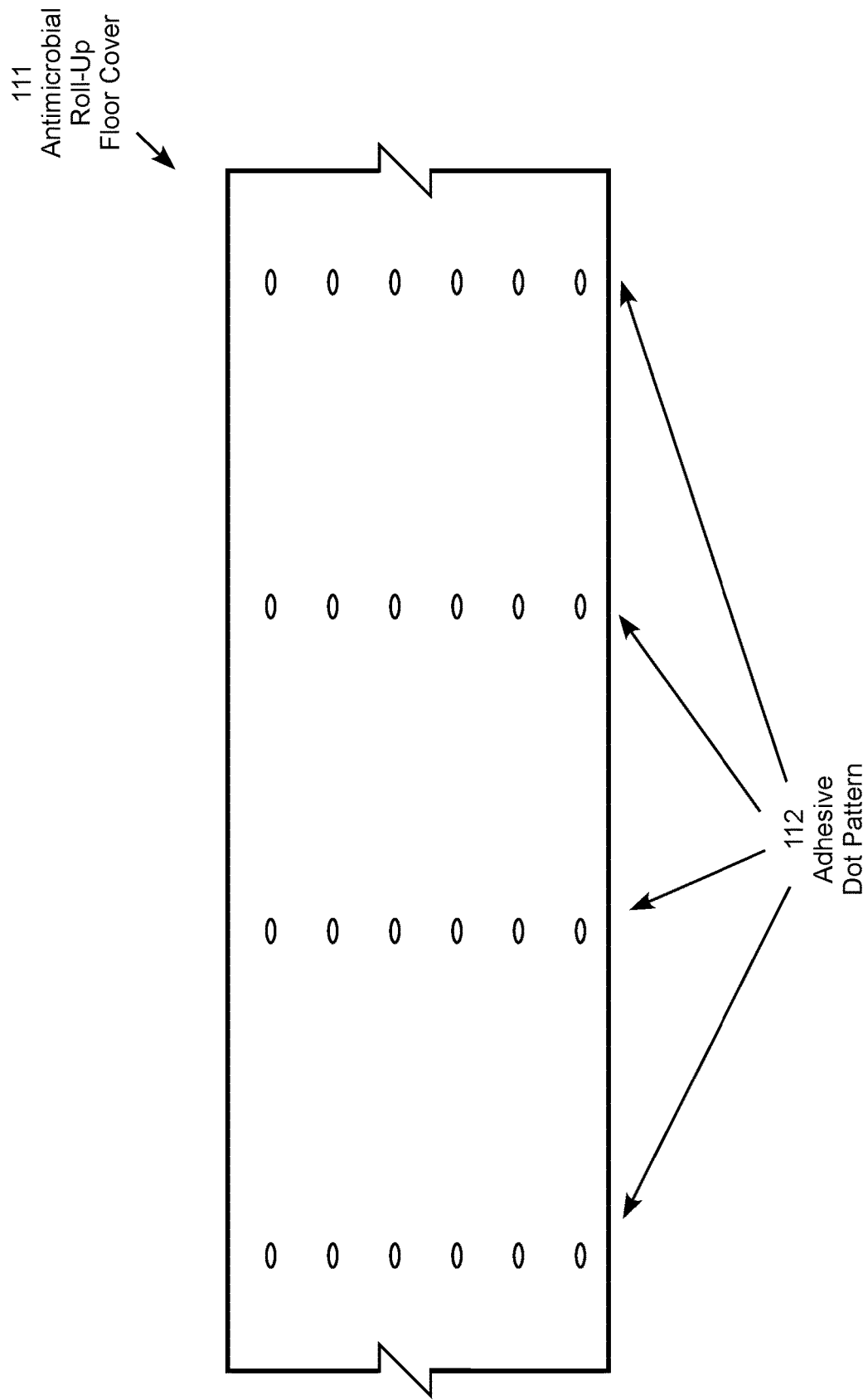
FIG. 11 is a conceptual top view of a fourth adhesive pattern for a roll-up floor cover.

For embodiments that include a scrim layer 4, FIG. 10 shows a third adhesive pattern 100 with third adhesive lines 102 extending in the transverse (cross-machine) direction. FIG. 11 shows a variation, in which the transverse lines of adhesive are replaced with rows of dashes or dots 112. In general the adhesive lines shown in FIG. 8 through FIG. 11 may be continuous, line segments, lines of dots, or another desired adhesive pattern.

Figure 12A:
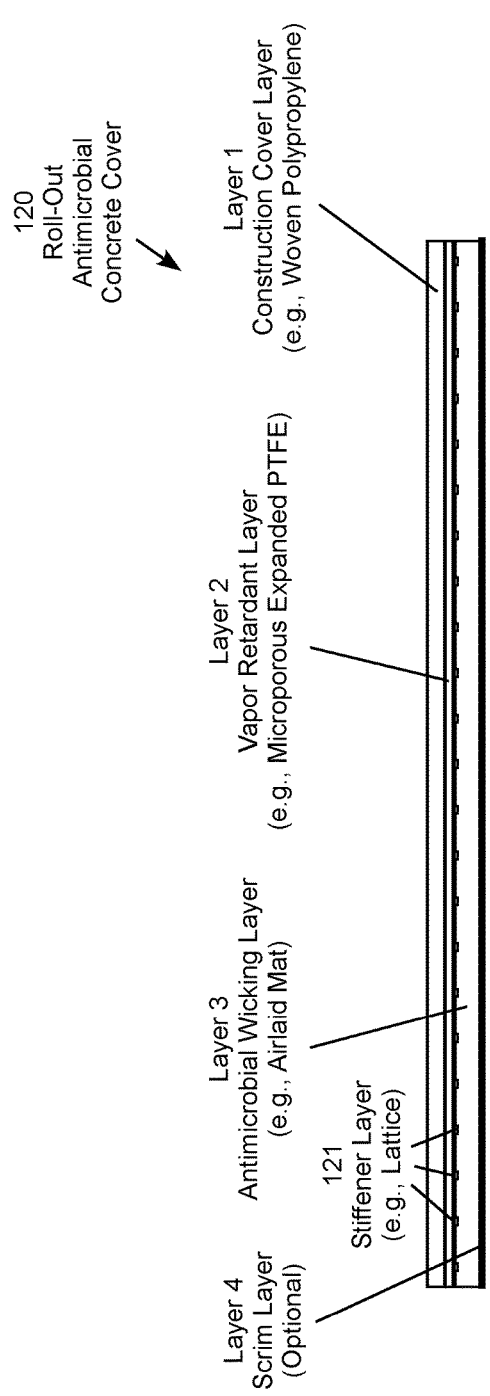
FIG. 12A is a conceptual side view of a roll-out antimicrobial floor cover that includes a stiffener layer.
Figure 12B:
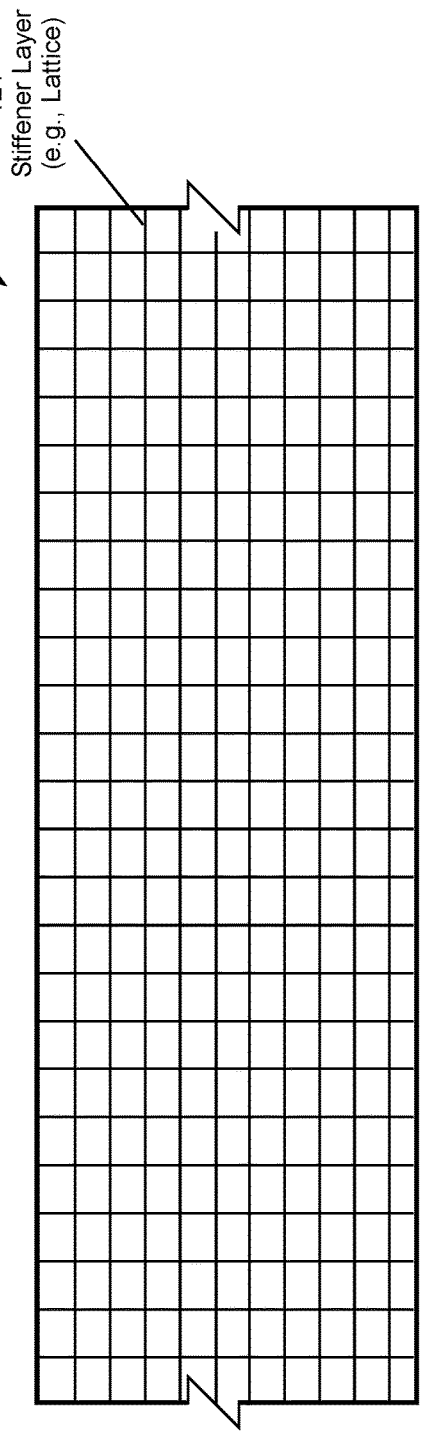
FIG. 12B is a conceptual top view of the roll-out antimicrobial floor cover with the stiffener layer.

FIG. 12A is a conceptual side view and FIG. 12B is a conceptual top view of a roll-out antimicrobial floor cover 120 that includes a stiffener layer 121. In general, adhering the layers together stiffens the roll-out antimicrobial cover 120 to mitigate gathering, folding or puckering when wheeled devices, such as forklifts, air compressors, gurneys, medical equipment and the like are roiled over the cover 120, which could otherwise jam or trip the wheels or damage the cover. Adding a polyurethane coating or film layer to the central layer further stiffens the cover for this purpose. Alternatively or additionally, the stiffener layer 121 may be added to mitigate gathering, folding or puckering under wheeled devices. For example, high density polyethylene (HDPE), acrylonitrile butadiene Styrene (ABS), polycarbonate, and Nylon are illustrative choices for lattice stiffeners. A representative stiffener layer includes a square, rectangular or rhomboidal lattice with cross members having lengths in the range of 4 to 10 inches, widths in the range of 0.125 to 0.25 inches, and thicknesses in the range of 0.0625 to 0.125 inches. Locating the stiffener lattice above the wicking layer 3 allows the stiffener lattice to settle into the airlaid mat with the PTFE layer 2 passing over the lattice to smooth the rolling surface on top of the cover while resisting gathering, folding or puckering under wheeled devices without impeding rolling up the cover. This makes the roll-out antimicrobial cover 120 an effective surface for wheeled devices, while providing for much easier and faster "rolling out" and "rolling up" in comparison to tile or panel temporary flooring options.

It will be appreciated that the temporary roll-out antimicrobial floor cover is particularly useful in a medical, sanitary or other locations where the antimicrobial feature is highly valued. For example, an antimicrobial roll-out antimicrobial cover is well suited to temporary "pop-up" medical facilities, temporary military medical facilities, hospitals, clinics, offices, schools, athletic surfaces, and the like. The stiffener layer may be a desirable option for these applications to prevent the cover from folding, gathering or puckering, which might otherwise interfere with the movement of wheeled devices, such as gurneys, medical equipment, sporting equipment, rolling desks, rolling office dividers, and the like. As another example, the stiffener lattice may excluded in other ground cover situations where fold resistance is not considered to be important, such as temporary automobile repair jobs, painting jobs, building resurfacing jobs, group exercise mats, art fabrication, party locations, and so forth.

It will be further appreciated that certain features and options may be desirable or more important of some applications versus others. For example, the central layer may be omitted when cost and reusability are important factors, but preventing folding is not important, such as an inexpensive paint drop cloth intended for use in a medical or other sterile environment. For applications where facilitating rolling devices on top of the cover and reusability are important attributes, the stiffener lattice and a PTFE second layer may be selected to prevent folding and improve the smoothness of the top of the cover as a rolling surface for wheeled devices. For other applications where preventing folding is not considered important, the stiffener lattice may be omitted. For other applications where the antimicrobial feature is extremely important, multiple antimicrobial agents may be formed into the airlaid mat and sprayed between layers. Many other feature sets, options and applications will become apparent to those skilled in the art based upon the teachings of the invention.

In view of the preceding description, it will be appreciated that the roll-out temporary antimicrobial floor covers may be used for any type of floor and, more particularly, in medical and other facilities where antimicrobial action is desired. Although embodiment of the roll-out antimicrobial covers have been illustrated in the context of horizontal floors, it should be appreciated that they can be used as antimicrobial covers for other types of structures, such as counter tops, shelf liners, cabinet and drawer liners, seat covers, and so forth. Those skilled in the art will appreciate that the foregoing describes preferred embodiments of the invention and that many adjustments and alterations will be apparent to those skilled in the art within the spirit and scope of the invention as defined by the appended claims.

The invention claimed is:

1. A temporary floor cover, comprising:
   a top layer that is impervious to water and permeable to water vapor;
   a lower wicking layer comprising an airlaid mat and one or more antimicrobial agents, which is permeable to water and permeable to water vapor;
   wherein the temporary floor cover is configured to roll out for temporary positioning on a floor and to roll up for removal from the floor; and
   wherein at least one of the antimicrobial agents is incorporated into the airlaid mat during extrusion formation of the airlaid mat;
   wherein the top layer comprises woven polypropylene or polyethylene exhibiting a weight in the range of 6 to 10 ounces per square yard;
   wherein the lower layer comprises cellulose fluff pulp and one or more binders exhibiting a weight in the range of 4.0 to 7.5 ounces per square yard.

2. The temporary floor cover of claim 1, further comprising a central layer comprising a microporous membrane positioned between the top layer and the lower layer comprising.

3. The temporary floor cover of claim 1, further comprising a central layer comprising a coating or film layer.

4. The temporary floor cover of claim 3, wherein the central layer further comprises perforations through the coating or film layer.

5. The temporary floor cover of claim 1, further comprising a stiffening lattice positioned between the top layer and the lower layer.

6. The temporary floor cover of claim 1, further comprising an anti-snag scrim layer positioned below the lower layer.

7. The temporary floor cover of claim 1, further comprising a central layer comprising expanded polytetrafluoroethylene (PTFE) exhibiting a weight in the range of 0.5 to 1.5 ounces per square yard.

8. The temporary floor cover of claim 1, further comprising a stiffening lattice positioned between the top layer and the lower layer comprising cross members with lengths in the range of 4 to 10 inches, widths in the range of 0.125 to 0.25 inches, and thicknesses in the range of 0.0625 to 0.125 inches comprising polycarbonate, high density polyethylene (HDPE), acrylonitrile butadiene styrene (ABS), or Nylon.

9. The temporary floor cover of claim 1, wherein the antimicrobial agents include one or more of thiazolylbenzimidazole (TBZ), quaternary ammoniums (QACs or quats), silane QACs (si-quats), n-halamines, isothiazolinone, tiabendazole, polyhexamethylene biguanide (PHMB), triclosan, chitosan, sodium percarbonate, calcium hypochlorite, zinc pyrithione, a zirconium compound, a chlorine compound, and a metal compound.

10. The temporary floor cover of claim 1, wherein the antimicrobial agent is incorporated throughout the airlaid mat during extrusion formation of the airlaid mat by mixture prior to extrusion of the airlaid mat.

11. The temporary floor cover of claim 1, wherein the antimicrobial agent is incorporated into throughout the airlaid mat during extrusion formation of the airlaid mat by spray application after extrusion and prior to compression of the airlaid mat.

12. The temporary floor cover of claim 1, wherein the airlaid mat comprises a wicking layer.

13. The temporary floor cover of claim 12, wherein the wicking layer comprises cellulose fluff pulp.

14. The temporary floor cover of claim 13, wherein the wicking layer further comprises bi-component binder fibers, latex, or a combination of bi-component binder fibers and latex.

15. The temporary floor cover of claim 1, further comprising a central layer positioned between the airlaid mat and the top layer comprising an antimicrobial agent.

16. The temporary floor cover of claim 1, further comprising a bottom layer positioned against the airlaid mat comprising an antimicrobial agent.

17. A temporary floor cover, comprising:
  a woven polypropylene layer exhibiting a weight in the range of 6 to 10 ounces per square yard;
  an expanded PTFE layer exhibiting a weight in the range of 0.5 to 1.5 ounces per square yard; and
  a wicking layer comprising an airlaid mat comprising cellulose fluff pulp and one or more binders exhibiting a weight in the range of 4.0 to 7.5 ounces per square yard.

18. The temporary floor cover of claim 17, wherein the one or more binders comprise latex.

19. The temporary floor cover of claim 17, further comprising an antimicrobial agent.

20. The temporary floor cover of claim 17, further comprising a scrim layer.

* * * * *